United States Patent
Way

(10) Patent No.: US 10,661,209 B2
(45) Date of Patent: May 26, 2020

(54) FILTRATION MEDIA PACKS COMPRISING PLURALITY OF BOSSES BETWEEN FILTER MEDIA, FILTER ELEMENTS, AND METHODS FOR MANUFACTURING

(71) Applicant: Donaldson Company, Inc., Minneapolis, MN (US)

(72) Inventor: Paul A. Way, Edina, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 269 days.

(21) Appl. No.: 15/525,841

(22) PCT Filed: Nov. 10, 2015

(86) PCT No.: PCT/US2015/060002
§ 371 (c)(1),
(2) Date: May 10, 2017

(87) PCT Pub. No.: WO2016/077377
PCT Pub. Date: May 19, 2016

(65) Prior Publication Data
US 2017/0333818 A1    Nov. 23, 2017

Related U.S. Application Data

(60) Provisional application No. 62/187,458, filed on Jul. 1, 2015, provisional application No. 62/077,749, filed on Nov. 10, 2014.

(51) Int. Cl.
*B01D 39/16*    (2006.01)
*B01D 46/52*    (2006.01)
*B01D 46/00*    (2006.01)

(52) U.S. Cl.
CPC ..... *B01D 39/1692* (2013.01); *B01D 46/0001* (2013.01); *B01D 46/526* (2013.01);
(Continued)

(58) Field of Classification Search
CPC .. B01D 46/525; B01D 46/526; B01D 46/527; B01D 46/528; B01D 46/523;
(Continued)

(56) References Cited

U.S. PATENT DOCUMENTS 4,925,561 A    5/1990  Ishii et al.
4,963,171 A    10/1990 Osendorf
(Continued)

FOREIGN PATENT DOCUMENTS

DE    102012011065    12/2013
EP    2570169    3/2013
(Continued)

OTHER PUBLICATIONS

Communication Pursuant to Rules 161(1) and 162 EPC, for European Patent Application No. 15802255.8 dated Jun. 22, 2017 (2 pages).
(Continued)

*Primary Examiner* — Robert Clemente
(74) *Attorney, Agent, or Firm* — Pauly, DeVries Smith & Deffner LLC

(57) ABSTRACT

The present disclosure relates to filtration media packs, filter elements, and methods for manufacturing filtration media packs and filter elements. The present disclosure is directed to filtration media packs having alternating first media sheet and second media sheet secured together and forming a first flow face and a second flow face, wherein the first media sheet and the second media sheet provide a first separation or gap therebetween as a result of the presence of a first plurality of protrusions or bosses extending from at least one of the first media sheet or the second media sheet, and a second separation or gap therebetween as a result of a second plurality of protrusions or bosses extending from at least one of the first media sheet or the second media sheet,
(Continued)

and the media pack being closed to passage of unfiltered fluid therethrough from the first flow face to the second flow face or from the second flow face to the first flow face without filtering passage through the first media sheet or the second media sheet.

20 Claims, 22 Drawing Sheets

(52) U.S. Cl.
CPC ...... *B01D 46/527* (2013.01); *B01D 2239/065* (2013.01); *B01D 2265/04* (2013.01); *B01D 2275/105* (2013.01)

(58) Field of Classification Search
CPC ............ B01D 39/1692; B01D 2265/04; B01D 2275/105; B01D 2239/065
See application file for complete search history.

(56) References Cited

U.S. PATENT DOCUMENTS

| | | | |
|---|---|---|---|
| 5,049,326 | A | 9/1991 | Matsumoto et al. |
| 5,125,941 | A | 6/1992 | Ernst et al. |
| 5,562,825 | A | 10/1996 | Yamada et al. |
| 5,772,883 | A | 6/1998 | Rothman et al. |
| D396,098 | S | 7/1998 | Gillingham |
| 5,792,247 | A | 8/1998 | Gillingham et al. |
| D398,046 | S | 9/1998 | Gillingham |
| D399,944 | S | 10/1998 | Gillingham |
| 5,820,646 | A | 10/1998 | Gillingham et al. |
| 5,895,547 | A | 4/1999 | Kathrein et al. |
| 5,895,574 | A | 4/1999 | Friedmann et al. |
| 5,902,364 | A | 5/1999 | Toker et al. |
| D428,128 | S | 7/2000 | Gillingham |
| 6,179,890 | B1 | 1/2001 | Ramos |
| D437,401 | S | 2/2001 | Ramos |
| 6,190,432 | B1 | 2/2001 | Gieseke et al. |
| 6,210,469 | B1 | 4/2001 | Tokar |
| 6,235,195 | B1 | 5/2001 | Tokar |
| 6,348,084 | B1 | 2/2002 | Gieseke |
| 6,348,085 | B1 | 2/2002 | Tokar |
| 6,350,291 | B1 | 2/2002 | Gieseke |
| 6,350,296 | B1 | 2/2002 | Warner |
| 6,610,126 | B2 | 8/2003 | Xu |
| 6,652,614 | B2 | 11/2003 | Gieseke et al. |
| 6,673,136 | B2 | 1/2004 | Gillingham et al. |
| 6,955,775 | B2 | 10/2005 | Chung et al. |
| 7,070,642 | B2 | 7/2006 | Scott et al. |
| 7,270,693 | B2 | 9/2007 | Chung et al. |
| 8,216,335 | B2 | 7/2012 | Scott et al. |
| 8,226,786 | B2 | 7/2012 | Risch et al. |
| 8,603,210 | B2 | 12/2013 | Champion et al. |
| 2005/0166561 | A1 | 8/2005 | Schrage |
| 2008/0120952 | A1* | 5/2008 | Chilton ................ B01D 46/528 55/488 |
| 2012/0196733 | A1* | 8/2012 | Moe ..................... B01D 25/001 493/379 |
| 2013/0269529 | A1 | 10/2013 | Seeberger et al. |

FOREIGN PATENT DOCUMENTS

| | | |
|---|---|---|
| GB | 480810 | 3/1938 |
| JP | H0389912 | 4/1991 |
| WO | 2006076456 | 7/2006 |
| WO | 2006076479 | 7/2006 |
| WO | 2007056589 | 5/2007 |
| WO | 2007133635 | 11/2007 |
| WO | 2015105887 | 7/2015 |
| WO | 2016077377 | 5/2016 |

OTHER PUBLICATIONS

Response to Communication Pursuant to Rules 161(1) and 162 EPC for European Patent Application No. 15802255.8 filed with the EPO Dec. 20, 2017 (12 pages).
International Preliminary Report on Patentability for PCT Application No. PCT/US2015/060002 dated May 26, 2017 (12 pages).
International Search Report and Written Opinion for PCT Application No. PCT/US2015/060002, dated Mar. 30, 2016 (14) pages.
First Office Action for Chinese Patent Application No. 201580058670.1 dated Jan. 9, 2019 (23 pages) with English translation.
Second Office Action for Chinese Patent Application No. 201580058670.1 dated Sep. 5, 2019 (16 pages) with English Translation.

* cited by examiner

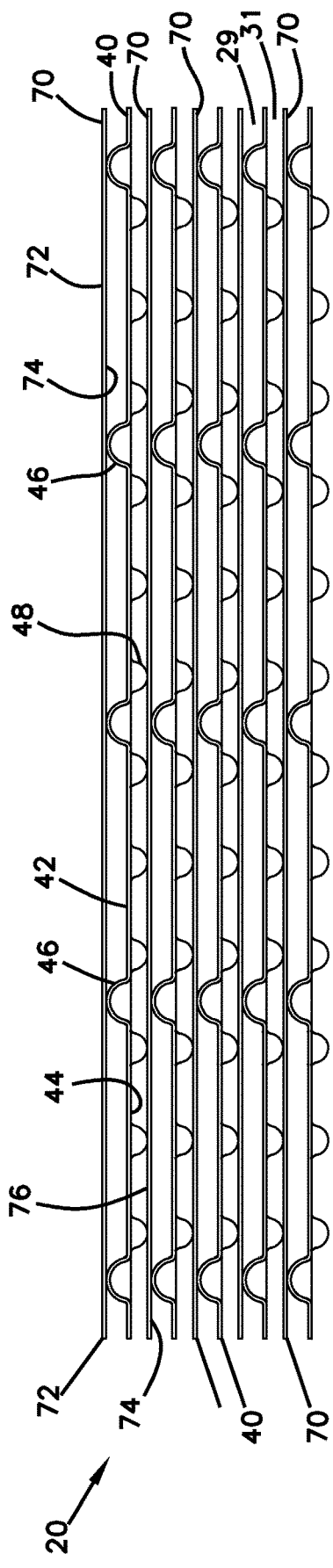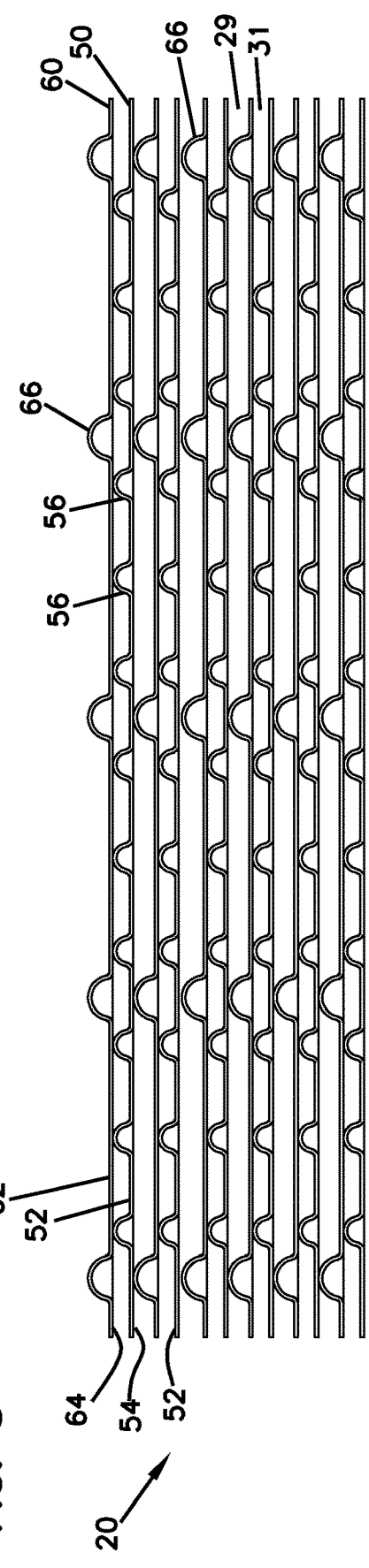

FILTRATION MEDIA PACKS COMPRISING PLURALITY OF BOSSES BETWEEN FILTER MEDIA, FILTER ELEMENTS, AND METHODS FOR MANUFACTURING

CROSS-REFERENCE TO RELATED APPLICATIONS

This application is being filed on 10 Nov. 2015 as a PCT International Patent Application and claims the benefit of U.S. Patent Application Ser. No. 62/077,749, filed on Nov. 10, 2014, and U.S. Patent Application Ser. No. 62/187,458, filed on Jul. 1, 2015, the disclosures of which are incorporated herein by reference in their entireties.

TECHNICAL FIELD

The present disclosure relates to filtration media packs, filter elements, and methods for manufacturing filtration media packs and filter elements. The present disclosure is directed to filtration media packs having alternating first media sheet and second media sheet secured together, and forming a first flow face and a second flow face. The alternating first media sheet and second media sheet provide a first separation or gap therebetween as a result of the presence of a first plurality of protrusions or bosses extending from at least one of the first media sheet or the second media sheet, and a second separation or gap therebetween as a result of a second plurality of protrusions or bosses extending from at least one of the first media sheet or the second media sheet. The media pack is closed to passage of unfiltered fluid therethrough from the first flow face to the second flow face or from the second flow face to the first flow face without filtering passage through the first media sheet or the second media sheet.

BACKGROUND

Fluid streams, such as air streams, often carry contaminant material. In many instances, it is desirable to filter some or all of the contaminant material from the fluid streams. For example, particulate contaminants can be carried by air streams into internal combustion engines for motorized vehicles or for power generation equipment. It is preferred for such systems that selected contaminant material, such as particulate contaminants, be removed from, or have its level reduced in, the air stream. Also liquid streams in the engine lubrication systems, hydraulic systems, coolant systems, and fuel systems, can carry particulate contaminant that should be filtered. It is preferred for such systems that the fluid streams are free from select contaminant material or have the level of contaminant material therein reduced. A variety of fluid filter arrangements (air or liquid filter) have been developed for contaminant reduction.

Many filter arrangements include pleated or folded filtration media. Pleated or folded filtration media packs have a tendency to be non-self-supporting. Typically, some type of structure is used to support or stabilize the pleats of the pleated media pack. Furthermore, the filter media density of a pleated filtration media pack typically refers to the number of pleat faces per unit distance, and is often limited to reduce the occurrence of pleat faces contacting each other. Pleat faces that contact each other have a tendency to create masking or loss of filtration media effectiveness at the areas of contact. Exemplary pleated filtration media packs are disclosed, for example, in U.S. Pat. Nos. 8,216,335; 6,652,614; 8,603,210; 7,070,642; 4,963,171; and 5,125,941.

Another type of filtration media pack provided to address some of the shortcomings of pleated filtration media packs are referred to as fluted filtration media packs or z-filtration media packs. Exemplary z-filtration media packs are disclosed in, for example, U.S. Pat. Nos. 5,562,825; 5,049,326; 5,895,574; and 4,925,561. Such z-filtration media packs typically include alternating fluted media sheet and facing media sheet, and form a first flow face and a second flow face. While z-filtration media packs tend to be self-supporting and can provide for increased media density relative to certain pleated filtration media arrangements, z-filtration media packs have a tendency to suffer from masking at the locations where the fluted media sheet contacts the facing media sheet.

Continued improvement in the design of filtration media packs and filter elements is desired in order to provide improved properties including contaminant loading, longevity, compactness, media density, and fluid flow properties.

SUMMARY

The present disclosure is directed to a filter media pack. The filter media pack includes a media construction comprising a first media sheet and a second media sheet secured together and forming a first flow face and a second flow face, wherein each of the first media sheet and second media sheet includes a first side and a second side.

In a first embodiment of a filter media pack, the first media sheet includes a plurality of first bosses extending from the first media sheet first side toward the second media sheet to provide a first separation between the first media sheet first side and the second media second side, and the second media sheet includes a plurality of second bosses extending from the second media sheet first side in a same direction as the plurality of bosses on the first media sheet to provide a second separation between the second media sheet first side and the first media sheet second side. The first media sheet and the second media sheet are secured together at a first location to form the first separation open at the second flow face, and the first media sheet and the second media sheet are secured together at a second location to form the second separation open at the first flow face. The media construction is closed to the passage of unfiltered fluid therethrough from the first flow face to the second flow face, or from the second flow face to the first flow face without a filtering passage through the first media sheet or the second media sheet.

In one or more variations of the first embodiment, the first media sheet can include a plurality of third bosses extending from the first media sheet second side in an opposite direction as the plurality of first bosses to provide separation between the first media sheet second side and the second media sheet first side.

In one or more variations of the first embodiment, the second media sheet includes a plurality of fourth bosses extending from the second media sheet second side in an opposite direction as a plurality of first bosses to provide separation between the second media sheet second side and the first media sheet first side.

In an alternative filter media pack (referred to as a second embodiment), the first media sheet including a plurality of first bosses extending from the first media sheet first side toward the second media sheet to provide a first separation between the first media sheet first side and the second media sheet second side, and a plurality of second bosses extending from the first media sheet second side in a direction opposite the plurality of first bosses to provide a second separation between the first media sheet second side and the second media sheet first side. The first media sheet and the second media sheet secured together at a first location to form the first separation open at the second flow face, and the first media sheet and the second media sheet secured together at a second location to form the second separation open at the first flow face. The media construction being closed to passage of unfiltered fluid therethrough from the first flow face to the second flow face or from the second flow face to the first flow face without filtering passage through the first media sheet or the second media sheet.

In one or more variations of the second embodiment, the second media sheet can include a plurality of third bosses extending from the second media sheet first side in a same direction as the plurality of first bosses to provide separation between the second media sheet first side and the first media sheet second side.

In one or more variations of the second embodiment, the second media sheet includes a plurality of fourth bosses extending from the second media sheet second side in an opposite direction as a plurality of first bosses to provide separation between the second media sheet second side and the first media sheet first side.

In the various embodiments, the first media sheet and the second media sheet may each include a first edge that forms the first flow face and a second edge that forms the second flow face. The first location for securing the first media to the second media sheet extends proximate the first edge, and the second location for securing the first media sheet and the second media sheet extend proximate the second edge.

The above can include a combination or sub-combination of any of the features as described above and as described below. Example combinations should not be limited to including only those combinations. Indeed, advantages can be achieved from various sub-combinations of features.

Filter elements and methods of making filter media, media packs, and filter elements are described.

BRIEF DESCRIPTION OF THE DRAWINGS

FIG. 7 is a portion of a media pack formed from the media sheet of FIG. 1 alternating with a flat media sheet;

FIG. 8 is a portion of a media pack using alternating media sheets of FIGS. 3 and 5;

DETAILED DESCRIPTION

Figure 1:
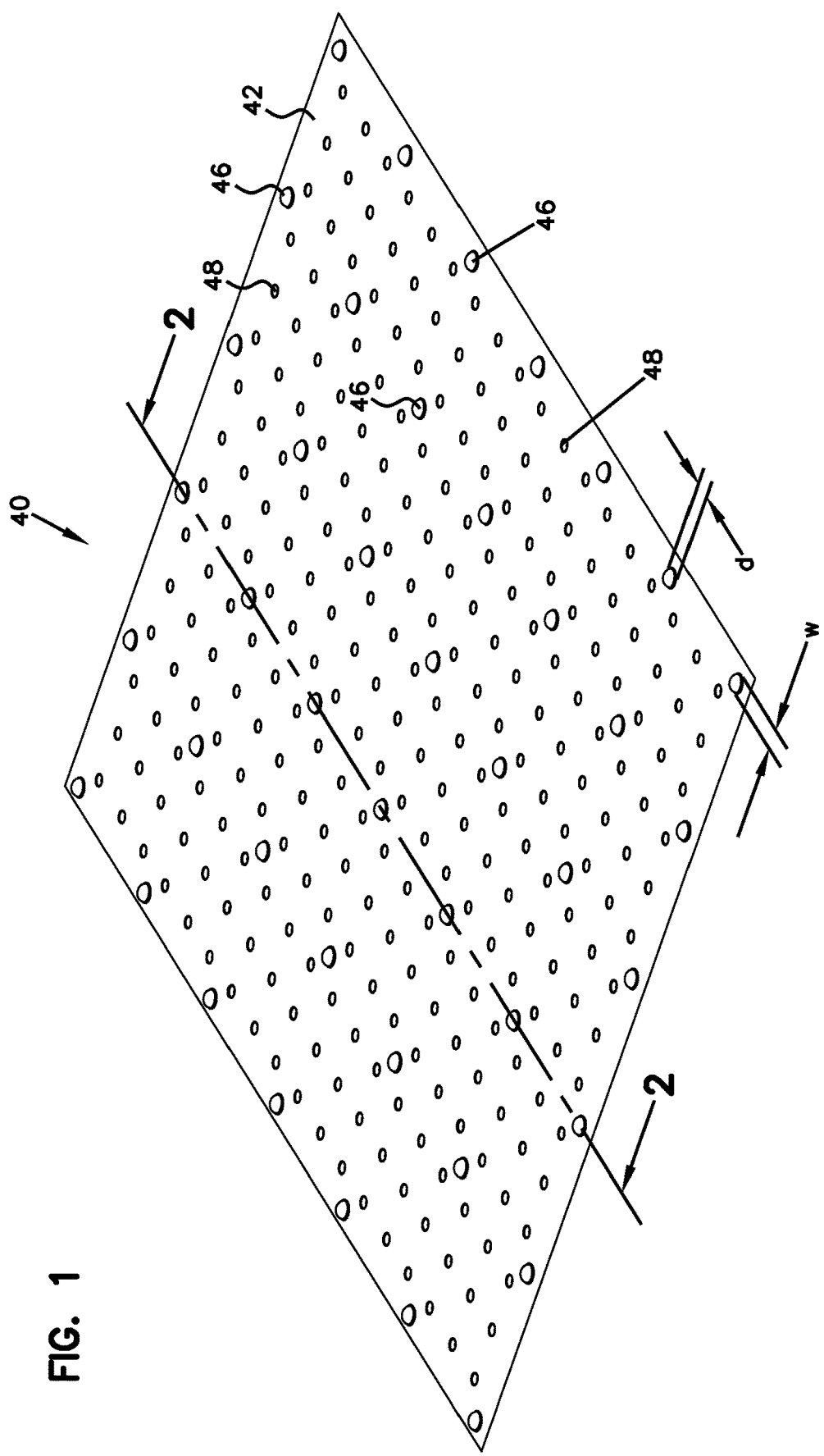
FIG. 1 is a perspective view of a first embodiment of a media sheet usable for forming a filter media pack, constructed in accordance with principles of this disclosure.

The disclosure relates to filtration media packs, filter elements or cartridges, and methods for manufacturing filtration media packs and filter elements or cartridges. In general, filtration media can be referred to more simply as "filter media" or "media" and refers to a substrate that is used for filtering particulate contaminants from a fluid stream. The fluid stream can be a gas stream or a liquid stream. An exemplary gas stream includes air, and the air can be provided for air intake for engines for motor vehicles, power generation equipment, combustion furnaces, HVAC, and for enclosed environments where particulates should be removed, such as work and home environments and clean rooms. The gas stream can also be a gas stream such as a gas stream to a gas turbine system. Exemplary liquid streams include engine lubrication systems, hydraulic systems, coolant systems, fuel systems, and water.

The filtration media pack can be formed from alternating layers of a first media sheet and a second media sheet. The alternating layers of the first media sheet and the second media sheet can be provided by repeating layers of single facer media. In general, single facer media refers to a combination of the first media sheet and the second media sheet. The single facer media can be arranged as repeating layers to provide the alternating first media sheet and second media sheet. In the media pack, the alternating first media sheet and second media sheet provide a first separation or gap therebetween to allow fluid to flow through the first separation or gap, and a second separation or gap therebetween to allow fluid to low through the second separation or gap. The media pack can be characterized as a coiled arrangement or as a stacked arrangement. In the case of a coiled arrangement, a length of the single facer media can be coiled or wound or rolled to form the media pack. The coiled arrangement can be referred to as a wound arrangement or as a rolled arrangement. In the case of a stacked arrangement, the single facer media can be cut into lengths that are stacked on top of one another to form a media pack. Exemplary coiled and stacked arrangements in the context of fluted filtration media packs or z-filtration media packs are disclosed, for example, in U.S. Pat. Nos. 5,820,646; 5,772,883; 5,902,364; 5,792,247; 5,895,574; 6,210,469; 6,190,432; 6,350,296; 6,179,890; 6,235,195; 5,895,574; Des. 399,944; Des. 428,128; Des. 396,098; Des. 398,046; and Des 437,401; each of these sixteen cited references being incorporated by reference. In the context of such fluted filtration media packs or z-filtration media packs, the separation between the alternating sheets of media are typically provided primarily as a result of the amplitude or height of the flutes of the alternating fluted sheet. In contrast, media packs according to this disclosure provide separation as a result of bosses extending from one or more of the first and/or second media sheets. The bosses can also be referred to as protrusions or dimples or bumps and are formed as a result of deformation of the first and/or second media sheets. Alternatively, the bosses can be formed by the addition of a substance or material to the surface of the media such as, for example, a small bead of adhesive or polymer. In general, the distance of the first separation and the second separation can be defined by the height of the bosses located therein.

FIGS. 9A-9D illustrate an example embodiment of a media pack 20, made in accordance with principles of this disclosure. The media pack 20 is a coiled construction 22. The media pack 20 can also be referred to as a rolled construction or as a wound construction. The coiled construction 22 can include alternating layers of a first media sheet 24 and a second media sheet 26 coiled together to form the media pack 20. The media pack 20 includes a first flow face 28 and a second, opposite flow face 30. In general, fluid, such as air or liquid, to be filtered can enter one of the first flow face 28 or the second flow face 30, pass through at least one of the first media sheet 24 or the second media sheet 26 in order provide for filtration, and then exit through the other one of the first flow face 28 or the second flow face 30. In the case of the media pack 20, the first flow face 28 includes a first separation or gap 29, and the second flow face 30 includes a second separation or gap 31. The first separation or gap 29 and the second separation or gap 31 refer to the separation between the first media sheet 24 and the second media sheet 26 that permits fluid to flow therethrough. In general, the flow through the media pack 20 can be said to be straight-through flow or axial flow, because the fluid, such as air or liquid to be filtered, flows generally along a straight line when flowing from the first flow face 28 to second flow face 30 (or vise versa), without having to turn a corner, such as a 90 degree turn, except to flow through one or more of the first media sheet 24 or the second media sheet 26. Alternatively, the flow can be said to be straight-through because the direction of flow when the fluid enters the media pack 20 can be provided in a same direction as the fluid exiting the media pack 20. In this example, the first flow face 28 and second flow face 30 are generally flat and parallel to each other. There can be variations, including, conical faces or slanted faces, and the faces can be parallel or non-parallel.

In order to force fluid flowing from either the first flow face 28 or the second flow face 30 to the other of the first flow face 28 or the second flow face 30 to flow through the first media sheet 24 or the second media sheet 26, the gap 29 or the gap 31 can be closed at some point thereby forcing the fluid through the media so that the fluid flows from the gap 29 to the gap 31 or from the gap 31 to the gap 29. By way of example, fluid flowing into the media pack 20 via the first flow face 28 may enter through the gap 29 because the gap 31 is closed as a result of the adhesive 35. The fluid is then not permitted to leave the media pack 20 via the gap 29 because at some point gap 29 is closed by the adhesive 33. As a result, the fluid flows through the media and then is available to flow via the gap 31 and out the second flow face 30. Thus, the adhesive 33 can provide closure of the gap 29 and the adhesive 35 can provide closure of the gap 31. In order to maximize the length of gap of each gap, the adhesive 35 can be provided proximate or at the first flow face 28, and the adhesive 33 can be provided proximate or at the second flow face 30. It should be appreciated that the length of each gap can be adjusted, such as shortened, by providing the adhesive further away from the flow face, if desired.

Figure 9A:
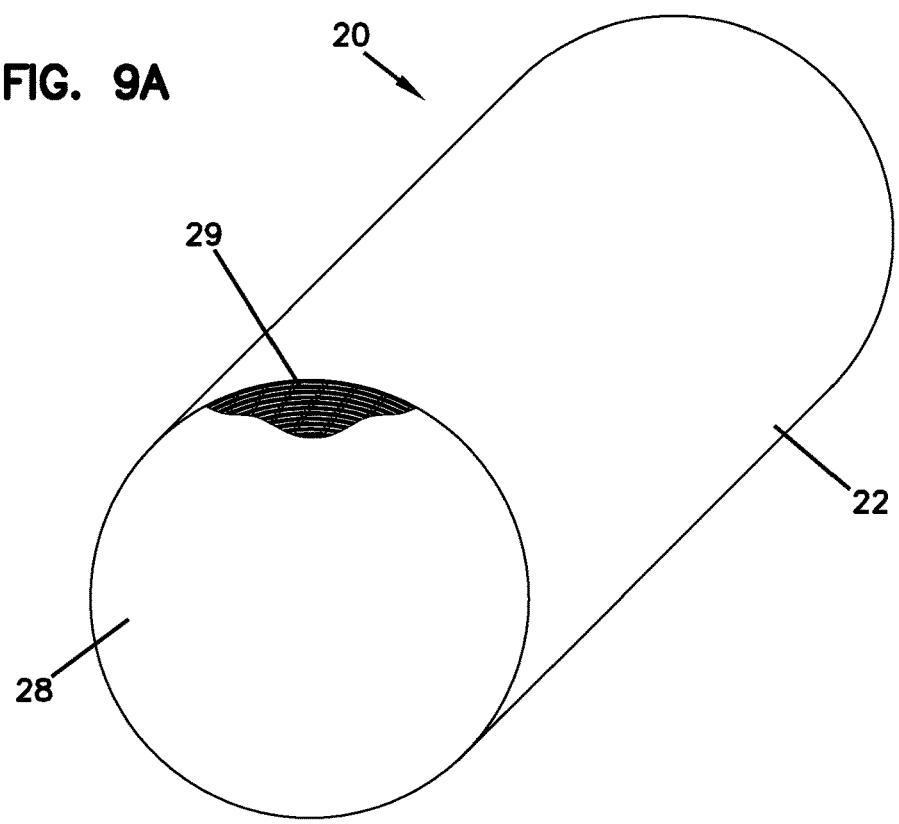
FIG. 9A is a schematic, perspective view of a filter media pack made from the construction of FIG. 7 and showing a first flow face.
Figure 9C:
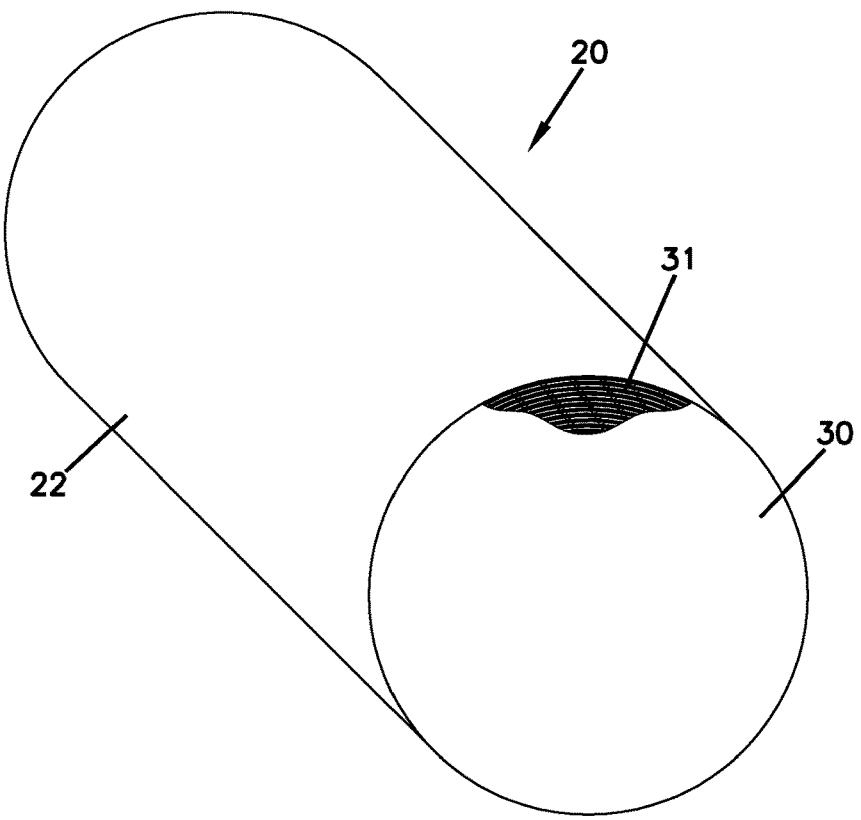
FIG. 9C is an schematic, perspective view of the filter media pack of FIG. 9A, but showing the second, opposite flow face.
Figure 9B:
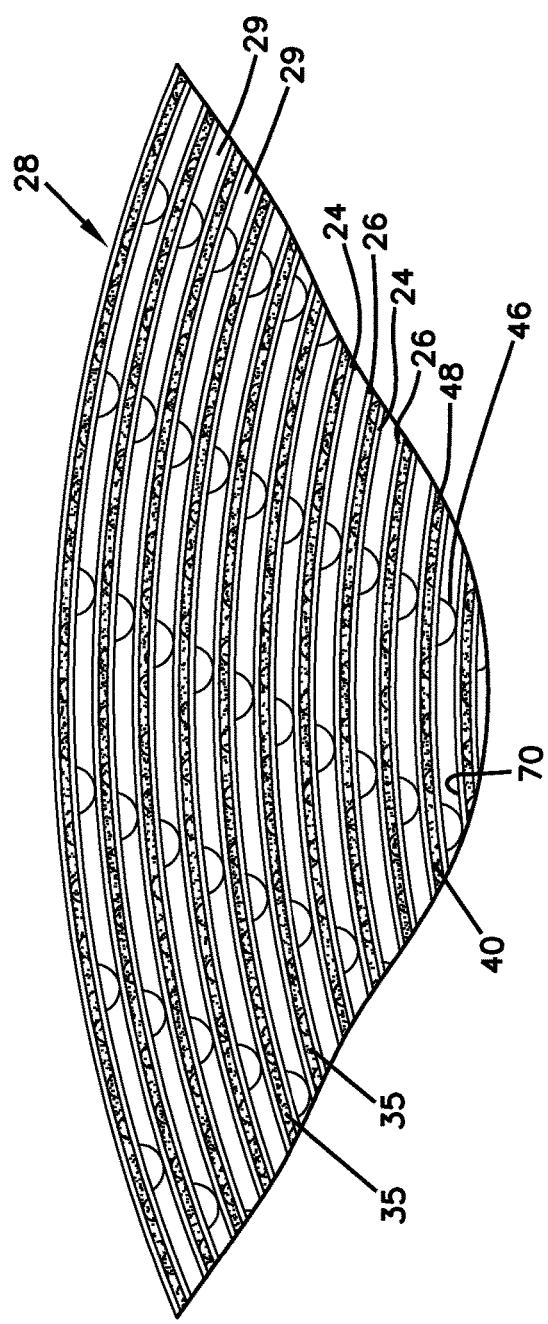
FIG. 9B is an enlarged view of a portion of the flow face of FIG. 9A.
Figure 9D:
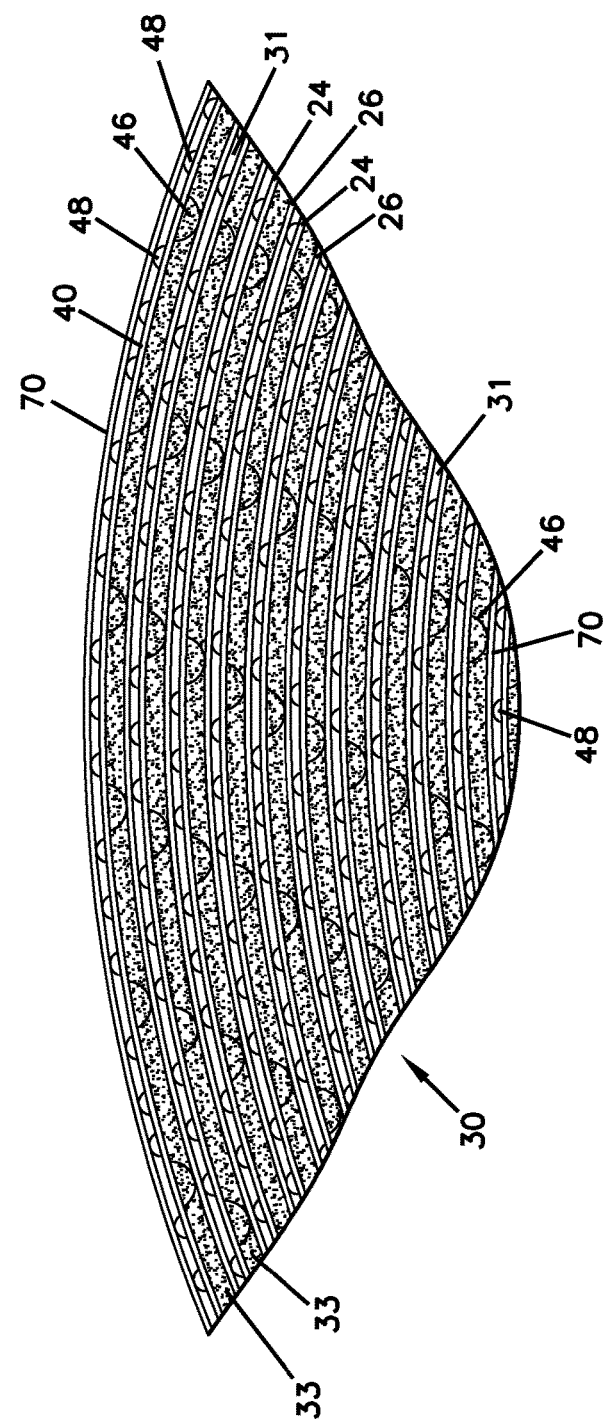
FIG. 9D is an enlarged view of a section of the flow face of FIG. 9C.
Figure 10:
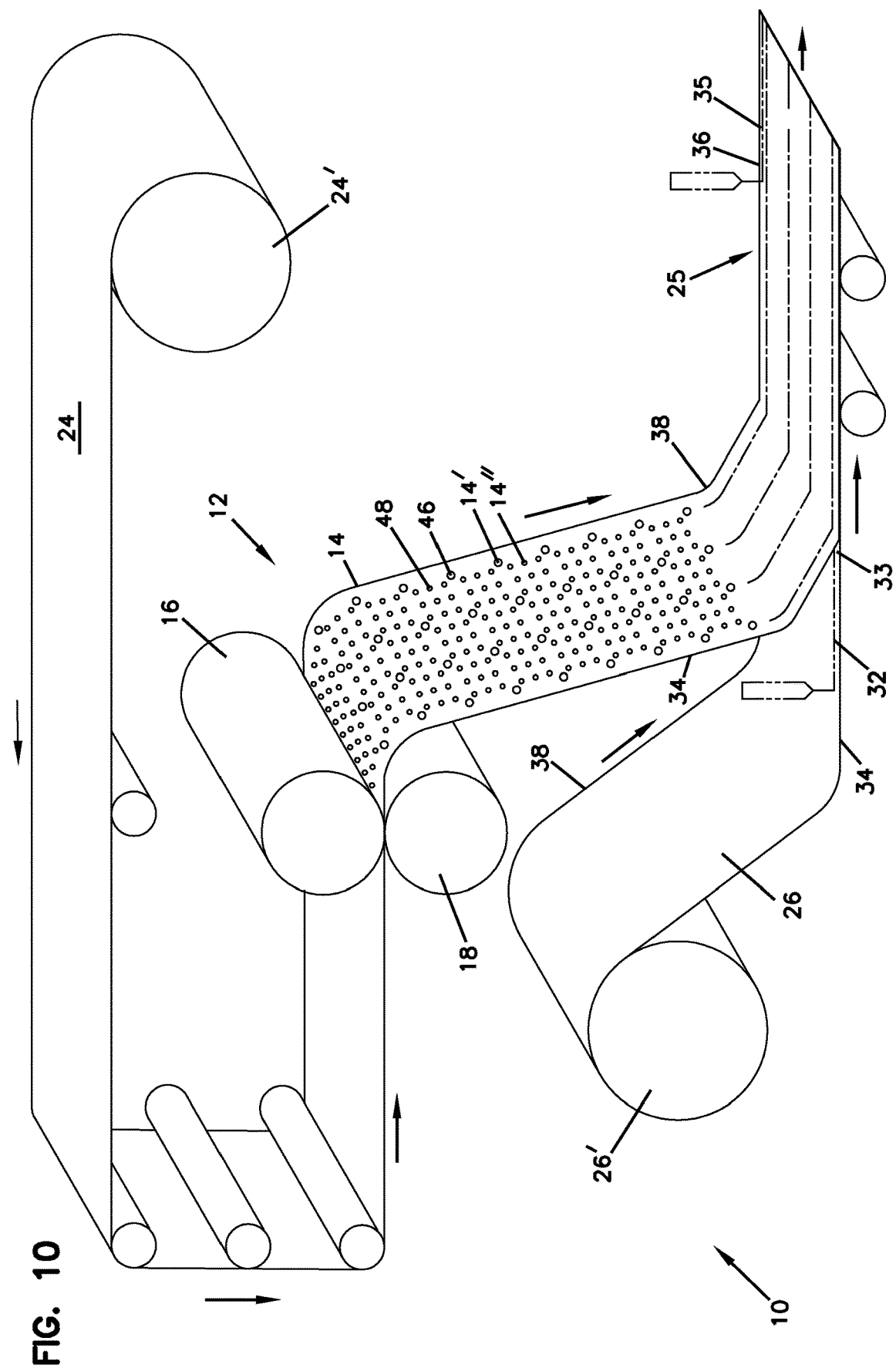
FIG. 10 is a schematic, perspective view of a method of forming the media pack of FIGS. 9A and 9C.

FIG. 10 shows a schematic illustration of an exemplary method of making the media pack 20 of FIGS. 9A-9D at reference number 10. In the method shown, the first media sheet 24 is unrolled from a roll 24', and the second media sheet 26 is unrolled from a roll 26'. The first media sheet 24 and the second media sheet 26 are adhered together at a first location 32 thereby forming a single facer media 25. In the example embodiment illustrated, the first location 32 can be adjacent or proximate a first edge 34 of the first media sheet 24 and the second media sheet 26.

After the first media sheet 24 and second media sheet 26 are adhered together at the first location 32 as a result of applying adhesive 33 at the first location 32, the resulting combination, which can be referred to as the single facer media 25, can be wound or coiled or stacked to form a media pack. In the case of stacking, the single facer media 25 is cut to form sheets that are stacked on top of each other. Prior to winding or coiling or stacking, adhesive 35 can be applied at a second location 36 for adhering the secured media sheets 24, 26. The second location 36 can be adjacent or proximate to a second edge 38 of the first media sheet 24 and second media sheet 26. The second location 36 can be provided at an opposite side of the first media sheet 24 and second media sheet 26 from the first location 32.

Adhering the first media sheet 24 and second media sheet 26 can include a variety of techniques. For example, the steps of adhering can include applying an adhesive 33 at the first location 32 and applying an adhesive 35 at the second location 36. The adhesive 33 and/or the adhesive 35 can be applied as a continuous bead or a plurality of discontinuous beads, and can be provided as a hot melt adhesive or as a reactive cure adhesive. In general, it may be desirable for the adhesives 33 and 35 to have an open time sufficient to allow the first media sheet 24 and the second media sheet 26 to slide relative to each other during formation of the media pack in order to adjust or distribute internal stresses that may occur as a result of, for example, forming the media pack. An "open time" refers to a time after application of the adhesive where the adhesive is not cured and the media sheets can move relative to each other. In the case of winding or coiling the single facer media 25, it may be beneficial to allow the first media sheet 24 and the second media sheet 26 to slide relative to each other prior to cure of the adhesive 33 and/or 35. Other techniques for forming the media pack are possible. For example, rather than winding or coiling, the media pack can be formed by stacking a plurality of discrete sheets of the single facer media 25. Furthermore, alternative techniques to applying adhesive for securing the first media sheet 24 to the second media sheet 26 for closing the gaps 29 and 31 can be provided.

The method 10 includes an embossing or dimpling station 12. At the embossing or dimpling station 12, either the first media sheet 24 or the second media sheet 26, or both of the first media sheet 24 and the second media sheet 26 are processed for the formation of bosses, projections, or dimples 14. In the method 10, it is the first media sheet 24 that is treated by the embossing station 12 to form bosses 14. In particular, the embossing station 12 includes a first roller 16 and a second roller 18 that form the bosses 14. The bosses 14 include first bosses 14' responsible for maintaining the first separation or gap 29, and second bosses 14" responsible for maintaining the second separation or gap 31. When bosses 14 are provided on both the first media sheet 24 and the second media sheet 26, an additional set of first roller 16 and second roller 18 can be provided for embossing the second media sheet 26. It should be understood that the reference to bosses 14 includes deformation of the media, and the bosses 14 can also be referred to as projections or dimples or bumps. In general, the terms bosses, projections, dimples, and bumps should be understood to be interchangeable in the context of this disclosure and that they relate to describing the result of deforming the media.

In accordance with the principles of this disclosure, a variety of implementations for the first media sheet 24 and second media sheet 26 are possible. The media sheets 24 and 26 can be made from a variety of materials. For example, the media sheets 24, 26, as with all the media sheets described herein, can comprise cellulose media, synthetic media, or a blend of cellulose and synthetic. The media sheets 24, 26 may also include an application of nanofibers to at least one of the sides of one of the media sheet. For example, each of the media sheets 24 and 26 may include an application of nanofibers to both sides of one of the media sheets or both of the media sheets.

Figure 2:
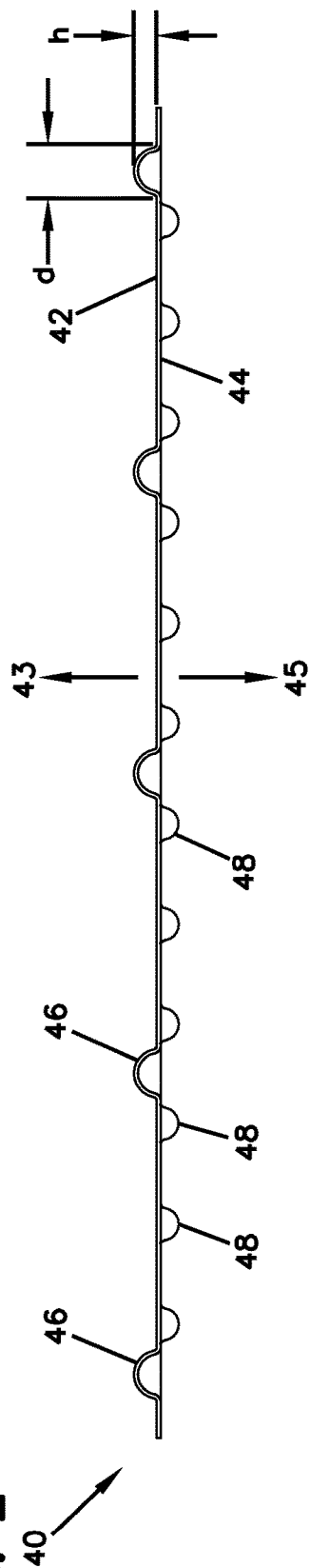
FIG. 2 is a cross-sectional view of the media sheet of FIG. 1, the cross-section being taken along the line 2-2 of FIG. 1.

FIGS. 1 and 2 illustrate a first embodiment of one of the first and second sheets 24, 26 shown herein at reference number 40. The media sheet 40 includes a first side 42 and an opposite second side 44. The media sheet 40 includes a plurality of first bosses 46 extending from the media sheet first side 42 in a first direction 43 away from the first side 42, and a plurality of second bosses 48 extending from the media sheet second side 44 in a second direction 45 away from the second side 44. In the case of the media sheet 40, the first direction 43 and the second direction 45 are opposite each other.

In this embodiment, the bosses 46 project away from a remaining portion of the first side 42 at a distance greater than the distance that the bosses 48 project away from a remaining portion of the second side 44. The bosses 46 are responsible for providing the first separation or gap 29, and the bosses 48 are responsible for providing the second separation or gap 31. It should be appreciated that the distance the bosses 46 and 48 extend away from the first side 42 and the second side 44, respectively, can be the same or different and can be adjusted to provide the desired first separation 29 and the desired second separation 31. In the context of a media pack, where the first separation (the first gap) is open to the inlet flow face, it is often desirable for the first gap to be relatively larger than the second gap to accommodate greater loading of material to be filtered from the fluid. In general, as the first gap fills up with particulate material, there is an associated pressure drop through the media pack. By providing a greater volume in the first separation, it is possible to accommodate a greater loading of particulate during filtration before experiencing an associated pressure drop. The second separation which corresponds to the outlet flow face can be relatively smaller because it accommodates the outlet flow of fluid and not the accumulation of particulate material. Of course, this can be reversed so that the first separation which receives the inlet flow of fluid is smaller than the second separation which receives the outlet flow of cleaned fluid. In addition, the first separation and the second separation can have about the same size. The density of the first bosses 46 and the second 48 can be provided to accommodate internal pressures within in the media pack as a result of fluid flowing therethrough. The density of the bosses refers to the number of bosses per unit area. In general, when the first separation is open to the inlet flow face, relatively fewer first bosses 46 are needed to maintain the first separation. The reason for this is that the fluid flowing into the inlet flow face fills the first separation and helps keep it open. In contrast, the second separation which is open to the outlet flow face tends to require a greater density of bosses 48 in order to resist media deformation that would tend to cause a collapse of the second separation as a result of fluid flowing through the media pack. Accordingly, the size of the bosses 46 and 48 can be adjusted to accommodate the desired first separation 29 and second separation 31, respectively, and the density of the bosses 46 and 48 can be provided to maintain the first separation 29 and the second separation 31, respectively, during filtration.

In FIG. 1, in this illustrated embodiment, there can be at least about three times more of the bosses 48 than there are of the bosses 46 in a given area. There can be at least four times as many of one type of bosses than the other, and there may be as many as five times as many or six times as many bosses of one type than the other type. Many different variations can be provided. In FIG. 1, in this example embodiment, the bosses 46 are in alignment with each other while the bosses 48 are in alignment with each other. The bosses 46 are staggered relative to the bosses 48. Many different variations can be made. The portion of the media sheet 40 that does not include the bosses 46 or the bosses 48 can be referred to as the "remaining portion" and can be characterized as non-fluted and/or non-corrugated, if desired.

In accordance with the first embodiment, the media sheet 40 can be used with a second media sheet for the media pack. The second media sheet can be a flat media sheet. In general, a flat media sheet refers to a media sheet without bosses thereon. An exemplary second media sheet is shown at reference number 26 (FIGS. 9B, 9D, and 10). Alternatively, the second media sheet can include bosses to help form or maintain the first separation or the second separation. Furthermore, the second media sheet can be provided as non-fluted or non-corrugated, and the media sheet 40 can be provided as non-fluted or non-corrugated.

Figure 4:
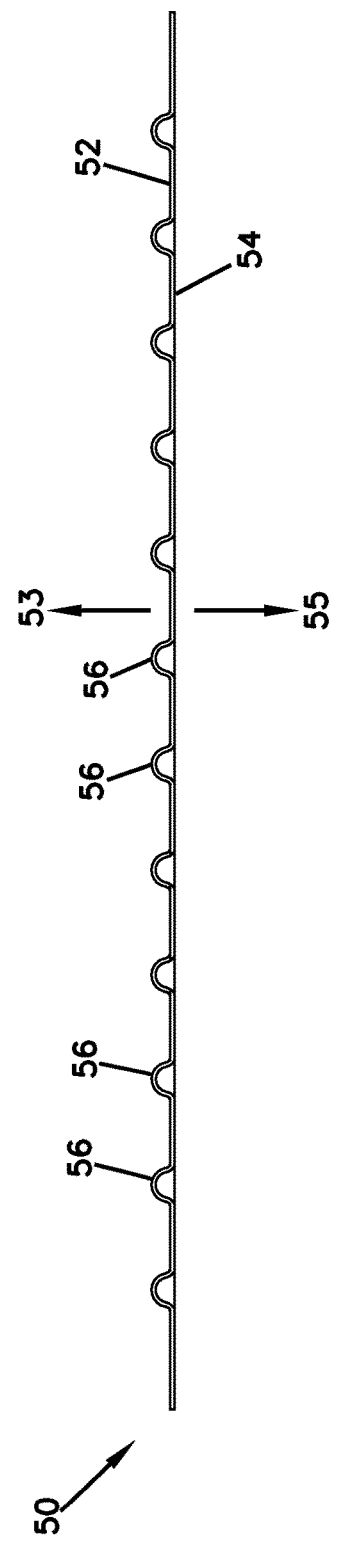
FIG. 4 is a cross-sectional view of the media sheet of FIG. 3, the cross-section being taken along the line 4-4 of FIG. 3.
Figure 3:
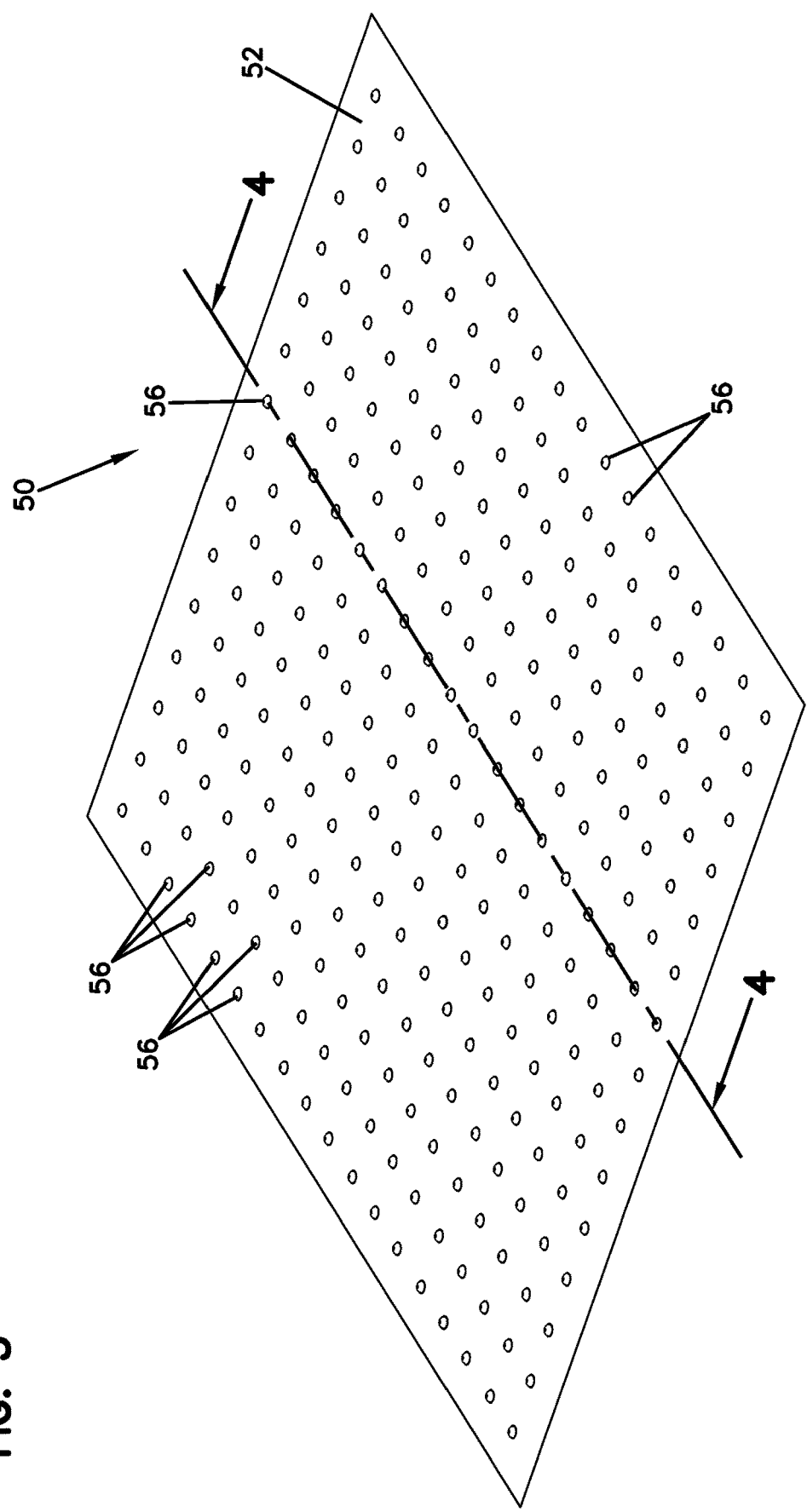
FIG. 3 is a perspective view of another embodiment of a media sheet usable for forming a media pack, constructed in accordance with the principles of this disclosure.

Now referring to FIGS. 3-6, a second embodiment is shown. FIGS. 3 and 4 illustrate another example embodiment of a media sheet 50 that can be used as the first media sheet 24 or the second media sheet 26 for the media pack 20. The media sheet 50 has a first side 52 and an opposite second side 54. Projecting from the first side 52 are a plurality of first bosses 56. In this embodiment, the bosses 56 project from a remaining portion of the first side 52 in a first direction 53, while the second side 54 includes no bosses extending from a remaining portion of the second side 54 in a second direction 55. In FIGS. 3 and 4, the bosses 56 are shown to be relatively evenly spaced with respect to each other. Many variations can be made. The reference to "a remaining portion" refers to the part of the first side or the second side that is not deformed by embossing. For example, the first bosses 56 include portions that form the first side 52 and the second side 54, but those portions are not part of the "remaining portion" of either the first side 52 or the second side 54. In other words, the "remaining portion" is the portion separate from the bosses. The "remaining portion" can be additionally characterized as non-fluted and/or non-corrugated, if desired.

Figure 6:
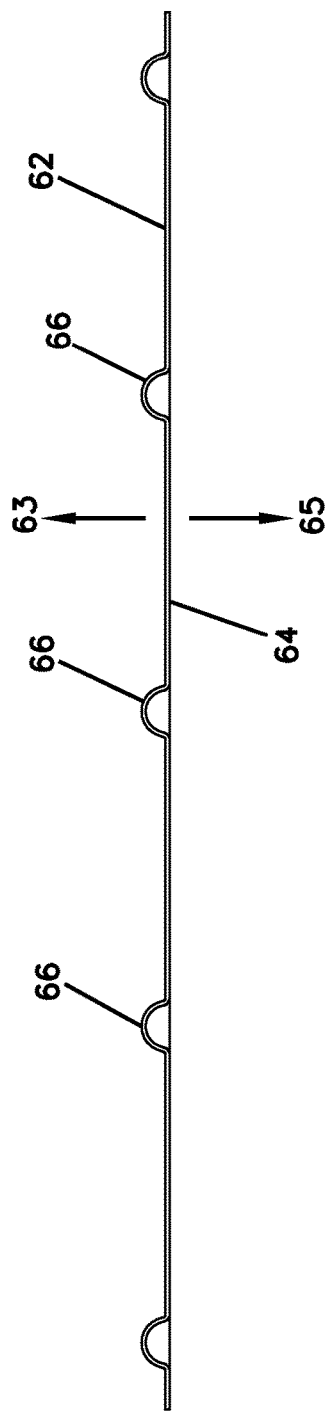
FIG. 6 is a cross-sectional view of the media sheet of FIG. 5, the cross-section being taken along the line 6-6 of FIG. 5.
Figure 5:
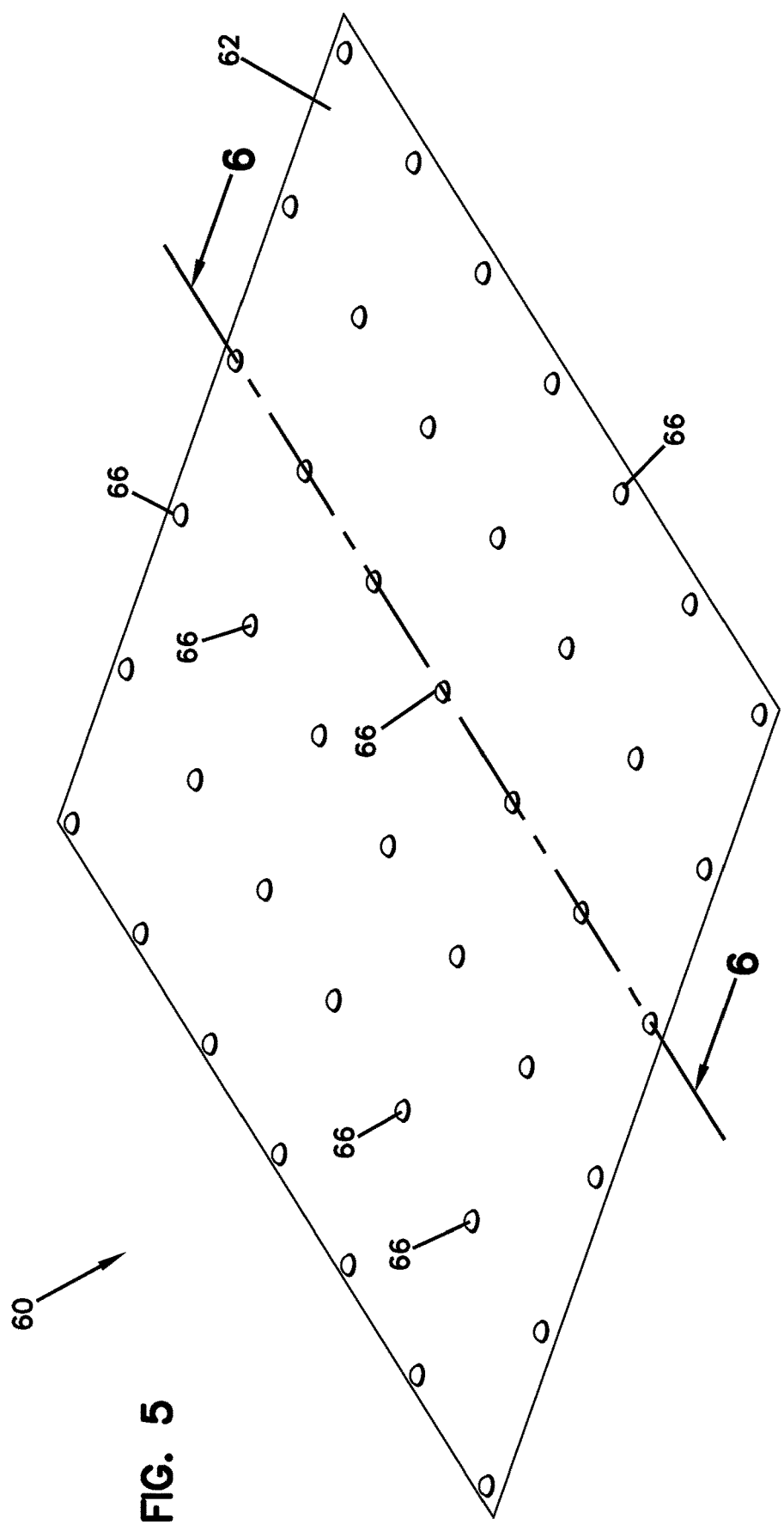
FIG. 5 is a perspective view of another embodiment of a media sheet usable for making a media pack, constructed in accordance with principles of this disclosure.

FIGS. 5 and 6 illustrate another example of a media sheet 60 that can be used as either the first or second media sheet 24, 26 in the media pack 20. The media sheet 60 includes a first side 62 and an opposite second side 64. Extending from a remaining portion of the first side 62 are a plurality of first bosses 66 in a first direction 63. The second side 64 is free of any bosses extending from a remaining portion of the second side 64 in a second direction 65. Comparing the embodiments of media sheet 50 of FIG. 3 and media sheet 60 of FIG. 5, it can be seen how there is a smaller density of bosses 66 for media sheet 60 compared to bosses 56 for media sheet 50. In this embodiment, the bosses 66 are evenly spaced relative to each other. Many different variations can be made. In addition, the portion of the media sheet 60 that does not include the bosses 66 can be characterized as the "remaining portion," and can be provided as non-fluted and/or non-corrugated, if desired.

In the second embodiment, the media sheet 50 and the media sheet 60 can be assembled together to form a single facer media and, subsequently, a media pack. In general, when the media sheet 50 and the media sheet 60 are arranged together, the first bosses 66 can be responsible for providing the first separation, and the first bosses 56 can be responsible for providing the second separation. In this situation, the first separation can be provided as the separation open to the inlet flow face and the second separation can be provided as a separation open to the outlet flow face so that the first separation has a greater volume than the second separation in a media pack. Of course, this arrangement can be reversed so that second separation can be provided as open to the inlet flow face and the first separation is open to the outlet flow face.

As discussed previously, the height of the bosses 46, 48, 56, and 66 can be selected to provide the desired media separations, and the density of the bosses 46, 48, 56 and 66 can be selected to accommodate the pressures on the media during filtration to thereby maintain the desired separations between media. Furthermore, the shapes of the bosses 46, 48, 56, and 66 can be selected as desired. In general, the shape may be selected to accommodate the deformation of the media without tearing or ripping the media. For example, sharp edges might tend to result in tears in the media as a result of the embossment technique. Accordingly, a preferred boss shape may be one that avoids sharp edges where tears in the media may occur. An exemplary shape that accomplishes this is a conical shape with a curved or domed top as shown in FIGS. 1-6.

Figure 12:
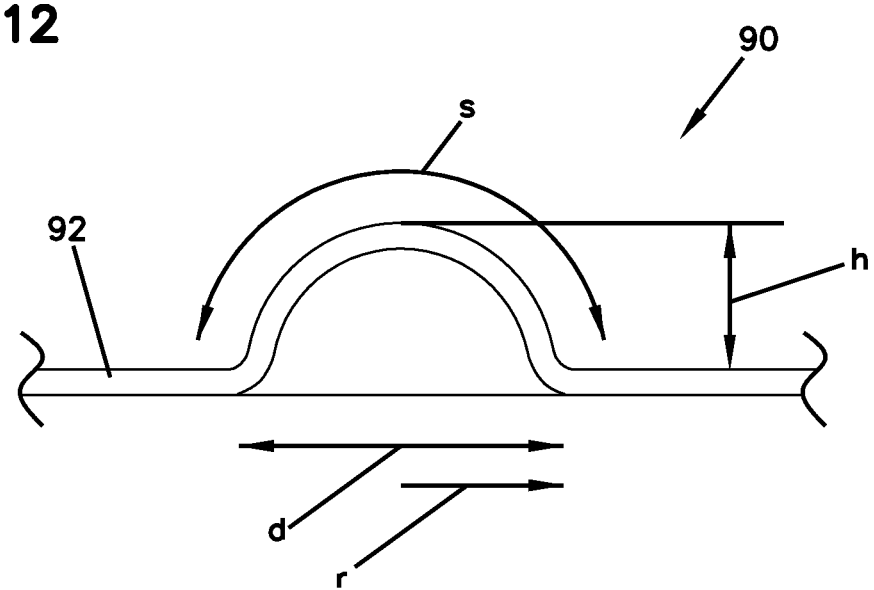
FIG. 12 is a sectional view of an exemplary boss, projection, or dimple in a media sheet in accordance with the principles of this disclosure.
Figure 13:
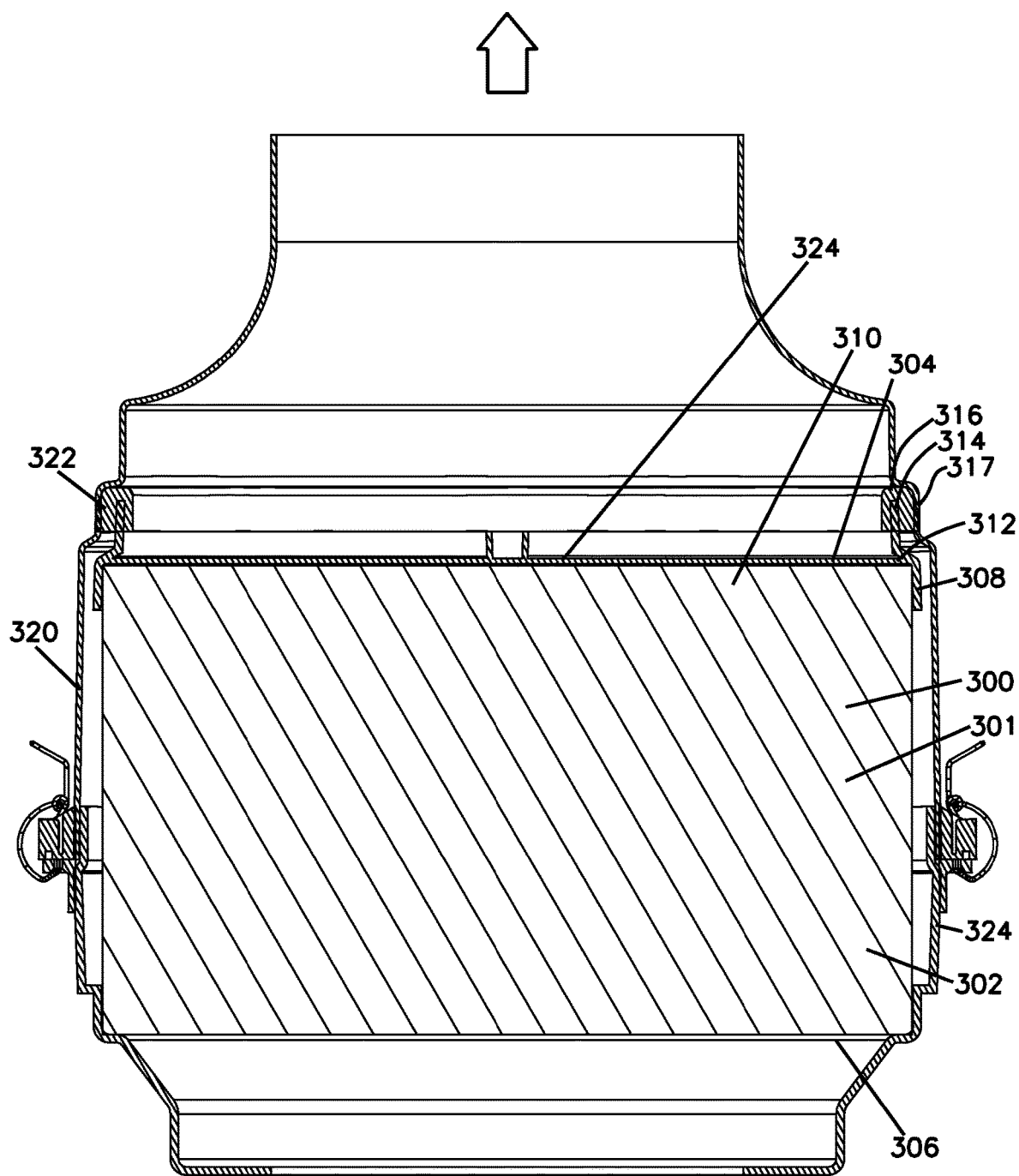
FIG. 13 is a sectional view of an exemplary air cleaner that can include a filter element containing the filter media pack according to the principles of this disclosure.

Now referring to FIG. 12, where an exemplary domed top boss or projection or dimple or bump is shown at reference number 90 extending from a media sheet 92. When embossing media, strain is induced due to the media stretching during the deformation process. If the strain exceeds the strain limit of the media, the media will tear instead of stretch. Tearing the media during the embossing process creates an undesirable leak path for unfiltered air to move from the dirty side to the clean side of the filter without filtration thereof. Accordingly, it is desirable to avoid tearing the media during the embossing process.

To prevent the media from tearing during the embossment process, the process can be provided so that it does not strain the media past the strain limit. This can be accomplished by increasing the surface area over which an embossment is formed relative to the height of the embossment. For small surface area embossments, shorter embossment heights may be achieved. For larger surface area embossments, taller embossment heights may be achieved without increasing the media strain to an unacceptable level during the embossment process. Typical level of acceptable strain is less than 12% for cellulosic media not containing synthetic fiber. Media containing synthetic fiber can typically tolerate strain in excess of 12% without tearing. The acceptable level of strain depends on media properties and environmental conditions at the time of processing. The strain limit can be increased, for example, by applying heat and moisture to the media during the embossment process.

The strain achieved during the embossment process can be calculated as the ratio of the difference between the length along the embossment along the length of the base of the embossment (under the length along the embodiment) and divided by the length of the base of the embossment. This strain may be expressed by the following equation.

$$\text{Strain} = (s-d)/d$$

The letter "d" refers to the length of the base of the embossment, and the letter "s" refers to the length along the embossment from the end points of the length of the base of the embossment. This is shown in FIG. 12. Increasing "d" allows for a greater value of "s" while maintaining the same strain. Greater "s" values typically allow taller (greater "h") bosses, projections, bumps, or dimples to be formed. The letter "h" refers to the dimple height. In the case of a dimple having a circular base, the base can be characterized as having a radius indicated by the letter "r" which is one half of the dimple length or width (d).

The dimple length (or width) and height can be selected as desired. For example, the dimple height may be selected to provide the upstream and/or downstream separation between adjacent media. The upstream and downstream separations can be provided as about the same or different. When the upstream and downstream separations are about the same (a difference of less than 10%), then the media pack can be said to exhibit volume symmetry. When the upstream and downstream separations are different by 10% or greater, the media pack can be said to exhibit volume asymmetry. An exemplary volume asymmetry occurs when one side exhibits a separation that is about 110% or greater compared to the separation of the other side. Exemplary ranges include about 110% to about 200%, and about 130% to about 170%. In many applications, the upstream separation can be provided as greater than the downstream separation. One reason for this is that the upstream side of the media pack tends to collect the particulates that are being filtered out of the fluid, and it may be desirable to provide the upstream side with greater volume to handle the particulate loading. The life of the media pack can be extended as a result of creating greater upstream separation. Accordingly, it may be desirable to provide a volume asymmetry wherein the upstream separation is greater than the downstream separation.

The upstream separation between adjacent media and the downstream separation between adjacent media can be characterized by the dimple height (h). Because the dimples help provide separation between adjacent sheets of media, the dimple height can be used to identify the media separation. Depending on whether the dimple being characterized is located on the upstream side or the downstream side, the media separation can be characterized as an upstream separation or a downstream separation. The following exemplary ranges of dimple height can be used to identify a separation between adjacent sheets of media. It should be understood, however, that the media has a tendency to deflect when provided under pressure. As a result of deflection of the media, the actual media separation during use may be somewhat different than the dimple height provided between adjacent media. The fluid flow tends to separate the media on the upstream side, and tends to push the media together on the downstream side. Depending on how well the media is supported by the dimples, the media separation during use might be less than the dimple height on the downstream side. In general, the dimples can be provided having a height and a dimple density or dimple separation that maintains the desired level of separation between adjacent media. By way of example, the dimples can be provided having a height of about 0.01 inch to about 0.25 inch and can be provided having a height of about 0.05 inch to about 0.2 inch. In general, the density of the dimples can be provided as about 4,500 dimples/in$^2$ to about 0.25 dimples/in$^2$. In addition, the media can be characterized as exhibiting a dimple separation. In general, the separation refers to the distance between closest dimples. In general, the dimple separation and dimple density can be selected to provide sufficient support to provide desired separation between adjacent media sheets and resist deflection of the media. By way of example, a dimple separation can be provided from about 0.03 inch to about 4.0 inch. It should additionally be appreciated that on the upstream side, it may be possible to provide separation between adjacent sheets without utilizing dimples. Because the pressure of the fluid tends to force the upstream side open, it may be possible to forego the presence of dimples on the upstream side. It is generally expected that the dimples on the downstream side would be advantageous to resist the pressure of the fluid in order to hold the adjacent sheets separate from each other and reduced masking.

As discussed above, the upstream side can be provided without dimples. However, dimples can be advantageous to help maintain separation on the upstream side. The dimples on the upstream side, when present, can be provided having a dimple height of about 0.05 inch to about 0.25 inch, or about 0.1 inch to about 0.2 inch. The dimples on the upstream side can have a dimple density of about 36 dimples/in$^2$ to about 0.25 dimples/in$^2$, about 9 dimples/in$^2$ to about 0.32 dimples/in$^2$, or about 2.3 dimples/in$^2$ to about 0.4 dimples/in$^2$. Furthermore, the upstream side can provide a dimple separation of about 0.5 inch to about 4.0 inches, a dimple separation of about 1.0 inch to about 3.5 inches, or a dimple separation of about 2.0 inches to about 3.0 inches. In the case of the downstream side, the dimples help keep the adjacent sheets from touching each other except at the location of the dimples. In general, the dimple height can be provided as about 0.01 inch to about 0.2 inch or about 0.05 inch to about 0.15 inch. The dimple density can be provided as about 4,500 dimples/in$^2$ to about 4 dimples/in$^2$, or about 3,600 dimples/in$^2$ to about 6.25 dimples/in$^2$. Furthermore, the dimple separation on the downstream side can be provided as about 0.03 inch to about 1.0 inch or about 0.05 inch to about 0.8 inch.

The bosses 46, 48, 56, 66 can have a perimeter area of at least 0.2 in-2, for example, 0.1 in sq.-0.26 in sq. The bosses can be separated from each other by a distance of at least 0.15 in, for example, about 0.2 in to about 1.0 in. The bosses 46, 48, 56, 66 can be populated with a boss density of at least 0.5 per square inch; in many examples, at least 1 per square inch, for example, about 5-30, or about 25 per square in. The bosses 46, 48, 56, 58 can have a conical sidewall. In other embodiments, the bosses 46, 48, 56, 58 can be domed in shape.

In FIG. 7, the first media sheet 40 is shown adhered to a flat sheet 70 wherein the flat sheet 70 is free of bosses. Of course, it should be understood that the flat sheet 70 can be replaced with a sheet having bosses extending from one side or both sides such as media sheet 40, 50, and 60 in order to help maintain the first separation 29 and the second separation 31. The construction shown can be provided as a result of winding or coiling a single facer media 25, or as a result of stacking a single facer media 25. The construction can be considered a coiled media pack or a stacked media pack depending upon whether it was formed as a result of winding or stacking, respectively.

As seen in FIG. 7, several layers of media are shown. In FIG. 7, the media sheet 40 includes first bosses 46 extending from the first media first side 42 toward the flat sheet 70, which is a second media sheet 72 in this embodiment. This provides a first separation 29 between the first media sheet 40 first side 42 and the second media sheet 72 second side 74. The bosses 48 extending from the second side 44 of the first media sheet 40 extend in a direction opposite the bosses 46 and provide a second separation 31 between the first media sheet second side 44 and the second media sheet first side 76.

As described above, the first media sheet 40 and the second media sheet 70 are adhered together at first location 32 to form the first separation open at the second flow face 30, while the first media sheet 40 and the second media sheet 70 are adhered together at the second location 36 to form the second separation open at the first flow face 28. When formed into a media pack, the media pack is closed to the passage to unfiltered fluid therethrough from the first face 28 to the second flow face 30 or from the second flow face 30 to the first flow face 28 without filtering the passage through the media, being media sheet 40 or flat sheet 70, in the illustrated embodiment of FIGS. 9B and 9D.

FIG. 8 illustrates another example embodiment of media used in the media pack. In this embodiment, the media sheet 50 is secured to the media sheet 60, and then coiled or stacked into a media pack. The media sheet 50 includes first bosses 56 extending from the first side 52 toward the second media sheet 60 to provide a first separation 29 between the first side 52 of the media sheet 50 and the second side 64 of the media sheet 60. A plurality of first bosses 66 extend from the first side 62 of the media sheet 60 in a same direction as the bosses 56 to provide a second separation 31 between the first side 62 of the second media sheet 60 and the second side 54 of the first media sheet 50. When the media sheet 50 and 60 are adhered together at the described first location 32 and second location 36, the first and second flow face 28, 30 are formed.

Figure 11:
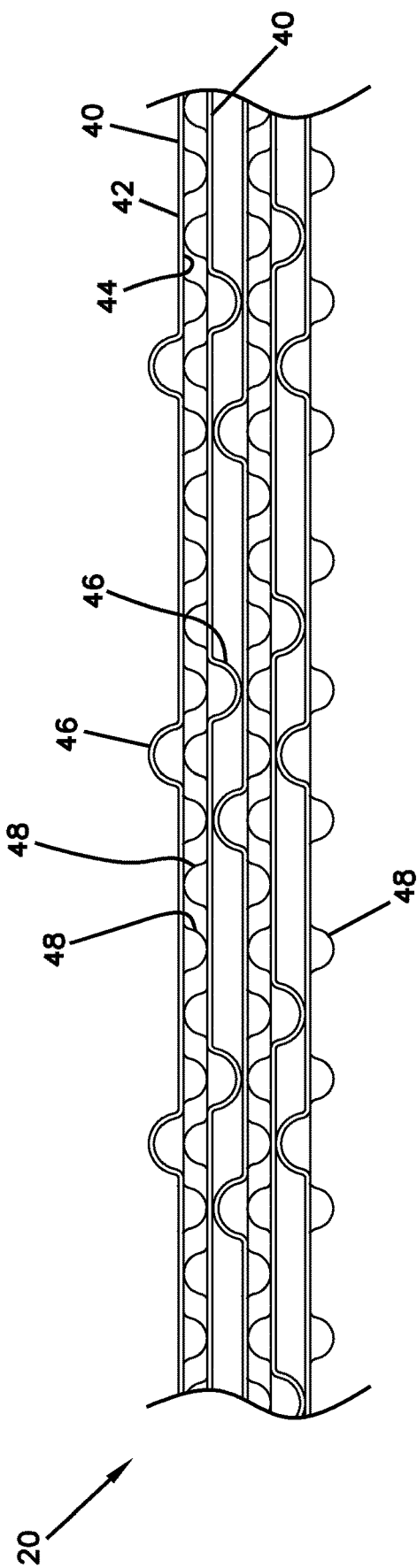
FIG. 11 is an example embodiment of a media construction made from two sheets of the media sheet of FIG. 1, constructed in accordance with principles of this disclosure.

In FIG. 11, the media sheet 40 used to form both the first media sheet and the second media sheet. The media sheet 40 is secured to a flipped over version of itself in FIG. 11 and then coiled or stacked to form a media pack. In this embodiment, both of the media sheets 40 forming the first media sheet 24 and second media sheet 26 include protrusions, dimples, or bosses extending from both the first side 42 and second side 44 to provide separations 29 and 31.

From a review of FIGS. 7, 8, and 11, it can be appreciated how the bosses 46, 48, 56, 66 in each of these embodiments are staggered relative to each other to help maintain the first separation 29 and the second separation 31.

Coiling of the media, rather than pleating, provides strength against media deformation under fluid flow. This strength can be referred to as hoop strength, and allows fewer bosses to be used on the face of the media, for instance, as compared to pleated media packs. In one example, deflection of a coiled element with bosses is reduced to 50% of the flat sheet deflection with the same boss arrangement. Reducing the number of bosses in the media pack, while maintaining the overall resistance to deflection, is beneficial since where each boss touches an adjacent media surface, masking occurs—reducing the potential filtration area available to dirty air.

The media packs can be arranged in any desired configuration. Exemplary configurations include coiled and stacked filter configurations. Coiled configurations are often arranged as a result of coiling or rolling a single facer media formed of the first media sheet and the second media sheet. Exemplary cross sectional shapes of the resulting coiled configuration include circular, racetrack, round, obround, and oval. In general, racetrack shaped refers to two opposite curved ends joined by two opposite straight sides. A round cross sectional shape may be preferable provided as a coiled configuration because it provides for a balanced distribution of forces across the media pack thereby maintaining the first and second separations. In contrast, a racetrack shaped coiled construction may be formed by winding into a racetrack shape or winding into a circular shape and then deforming to form a racetrack shape. An exemplary technique forming a racetrack shaped media pack can be a coiled and crushing technique such as that disclosed in U.S. Pat. No. 8,226,786. In the case of a racetrack shape, the forces within the media pack may differ across the media pack thereby resulting in certain parts of the first separation or the second separation as having a different value than other parts of the first separation or the second separation, respectively. As a result, the separation between the sheets of media may vary and the fluid flow through the media pack may be effected. Stacked configurations are often arranged as a result of alternately stacking a single facer media formed of the first media sheet and the second media sheet. Exemplary cross sectional shapes of the resulting stacked configuration include parallelograms such as square, rectangular, and rhombus. Alternatives are possible including various trapezoid shapes and kite shapes depending, for example, on how the length of each single facer sheet is selected. Similarities in media pack cross sectional shapes can be observed in the context of the previously mentioned fluted or z-filtration media described. While fluted filtration media typically includes an alternating single facer media formed from a fluted sheet and a facing sheet, the filtration media pack described herein need not contain a fluted sheet. That is, both sheets in the described filtration media can be provided as non-corrugated sheets or non-fluted sheets.

The filtration media pack includes an inlet flow face where fluid to be filtered enters the media pack, and an outlet flow face where filtered fluid exits the media pack. The inlet flow face and the outlet flow face can be provided on opposite sides on the media pack. In addition, the inlet flow face and the outlet flow face can be planer and parallel, but can also be provided as non-planer and/or non-parallel.

The bosses or protrusions can be configured to provide beneficial properties to the resulting media pack. As discussed previously, first bosses on one side of a media sheet (either extending from the media sheet or an adjacent media sheet) help define a first separation or gap between adjacent media sheets, and the bosses on the other side of the media sheet (either extending from the media sheet or an adjacent media sheet) help define a second separation or gap between adjacent media sheets. When the first bosses and the second bosses have heights that are equal or close to equal, the volume occupied by the first separation or gap and the volume occupied by the second volume or gap can be considered relatively equal, and the media pack can be considered as having volume symmetry. When the difference in volume is greater that about 10%, the media pack can be considered as having volume asymmetry. This difference between upstream and downstream volumes can be characterized as media volume asymmetry. Media volume asymmetry occurs when one side of a media pack (either the upstream side or the downstream side) has a different volume compared the other side of the media pleat pack. Such asymmetry may be created by the manner in which the bosses are constructed. For example, bosses or protrusions having a first height can result in a first separation or gap, and second set of bosses or protrusions can provide a second separation or gap. The first gap and the second gap can be the same or they can be different. The first gap and the second gap are different, and the difference is greater than about 10%, then the difference can be referred to as volume asymmetry. The difference between the first gap and the second gap is about 10% or less, than the difference may not actually be a result of volume asymmetry but rather differences in the bosses used to form the media or differences resulting from pressures of the fluid against the media during filtration.

Media volume asymmetry is beneficial for various reasons, including improved fluid flow and improved loading performance. In some implementations, media will demonstrate a media volume asymmetry of greater than 15%, greater than 20%, or greater than 50%.

FIGS. 1 and 2 shows dimensions of example protrusions 46 and 48 on the media. The protrusions 46 and 48 are shown with example length d, height h, and width w. The height of the projection can refer to the distance between the top of the projection and the tops of the flat portion of filtration media. The projection can be provided having a symmetric or asymmetric shape. When symmetric, the values of d and w can be the same or about the same. In the case of a dome-shape, the shape is expected to be relatively symmetrical and the width w and the length d can be the same or about the same. These dimensions of d and w are expected to be different when the shape is asymmetrical such as an oblong projection or dimple.

Filtration Media Generally

The filtration media can be provided as a relatively flexible media, including a non-woven fibrous material containing cellulose fibers, synthetic fibers, glass fibers, or combinations thereof, often including a resin therein, and sometimes treated with additional materials. An example filtration media can be characterized as a cellulosic filtration media that can tolerate about up to twelve percent (12%) strain without tearing when warm, but which will rupture at lower percent strain when dry and cold (as low as 3% with some media). The filtration media can be corrugated, embossed, scored or creased without unacceptable media damage. In addition, the filtration media is desirably of a nature such that it will maintain its boss structure during use. While some filtration media is available that can tolerate greater than about twelve percent (12%) strain, and such media can be used according to the invention, that type of media is typically more expensive because of the incorporation therein of synthetic fibers.

The filtration media can be provided with a fine fiber material on one or both sides thereof, for example, in accord with U.S. Pat. Nos. 6,955,775, 6,673,136, and 7,270,693, incorporated herein by reference in their entirety. In general, fine fiber can be referred to as polymer fine fiber (microfiber and nanofiber) and can be provided on the media to improve filtration performance. As a result of the presence of fine fiber on the media, it can be possible to provide media having a reduced weight or thickness while obtaining desired filtration properties. Accordingly, the presence of fine fiber on media can provide enhanced filtration properties, provide for the use of thinner media, or both. Fiber characterized as fine fiber can have a diameter of about 0.001 micron to about 10 microns, about 0.005 micron to about 5 microns, or about 0.01 micron to about 0.5 micron. Exemplary materials that can be used to form the fine fibers include polyvinylidene chloride, polyvinyl alcohol polymers, polyurethane, and co-polymers comprising various nylons such as nylon 6, nylon 4,6, nylon 6,6, nylon 6,10, and co-polymers thereof, polyvinyl chloride, PVDC, polystyrene, polyacrylonitrile, PMMA, PVDF, polyamides, and mixtures thereof.

Filter Elements

The following filter elements are provided as examples constructed in accordance with the present disclosure, and are not intended to be inclusive of all element designs made in accordance with the teachings herein. One of skill in the art will appreciate that various alternative elements can be constructed while still within the scope of the disclosure and claims. The filter elements can be utilized in various housing arrangements, and the filter elements can be replaced or cleaned or refurbished periodically, as desired. In the case of air filtration, the housing can be provided as part of an air cleaner for various air cleaning or processing applications including engine air intake, turbine intake, dust collection, and heating and air conditioning. In the case of liquid filtration, the housing can be part of a liquid cleaner for cleaning or processing, for example, water, oil, fuel, and hydraulic fluid.

Now referring to FIGS. 13-24, filter elements are described that include a filtration media pack. The filtration media pack can be provided based upon the media pack characterizations described herein, and based upon the exemplary media definitions. One will understand how the filter elements shown in FIGS. 13-24 can accept the media as characterized herein. For example, the media can be provided as coiled or stacked. Certain filter elements characterized as air filtration elements because they can be used to filter air, and other filters can be characterized as liquid filters because they filter liquids.

The filtration media pack can be provided as part of a filter element containing a radial seal as described in, for example, U.S. Pat. No. 6,350,291, US Patent Application No. US 2005/0166561, and International Publication No. WO 2007/056589, the disclosures of which are incorporated herein by reference. For example, referring to FIG. 13, the filter element 300 includes filtration media pack 301 that can be provided as a wound media pack 302 of single facer media, and can include a first face 304 and a second face 306. A frame 308 can be provided on a first end of the media pack 310, and can extend beyond the first face 304. Furthermore, the frame 308 can include a step or reduction in circumference 312 and a support 314 that extends beyond the first face 304. A seal member 316 can be provided on the support 314. When the filter element 301 is introduced within the housing 320, the seal member 316 engages the housing sealing surface 322 to provide a seal so that unfiltered air does not bypass the filtration media pack 300. The seal member 316 can be characterized as a radial seal because the seal member 316 includes a seal surface 317 that engages the housing sealing surface 322 in a radial direction to provide sealing. In addition, the frame 308 can include a media pack cross brace or support structure 324 that helps support the frame 308 and helps reduce telescoping of the air filtration media pack 300. An access cover 324 can be provided for enclosing the filter element 300 within the housing 320.

Figure 14:
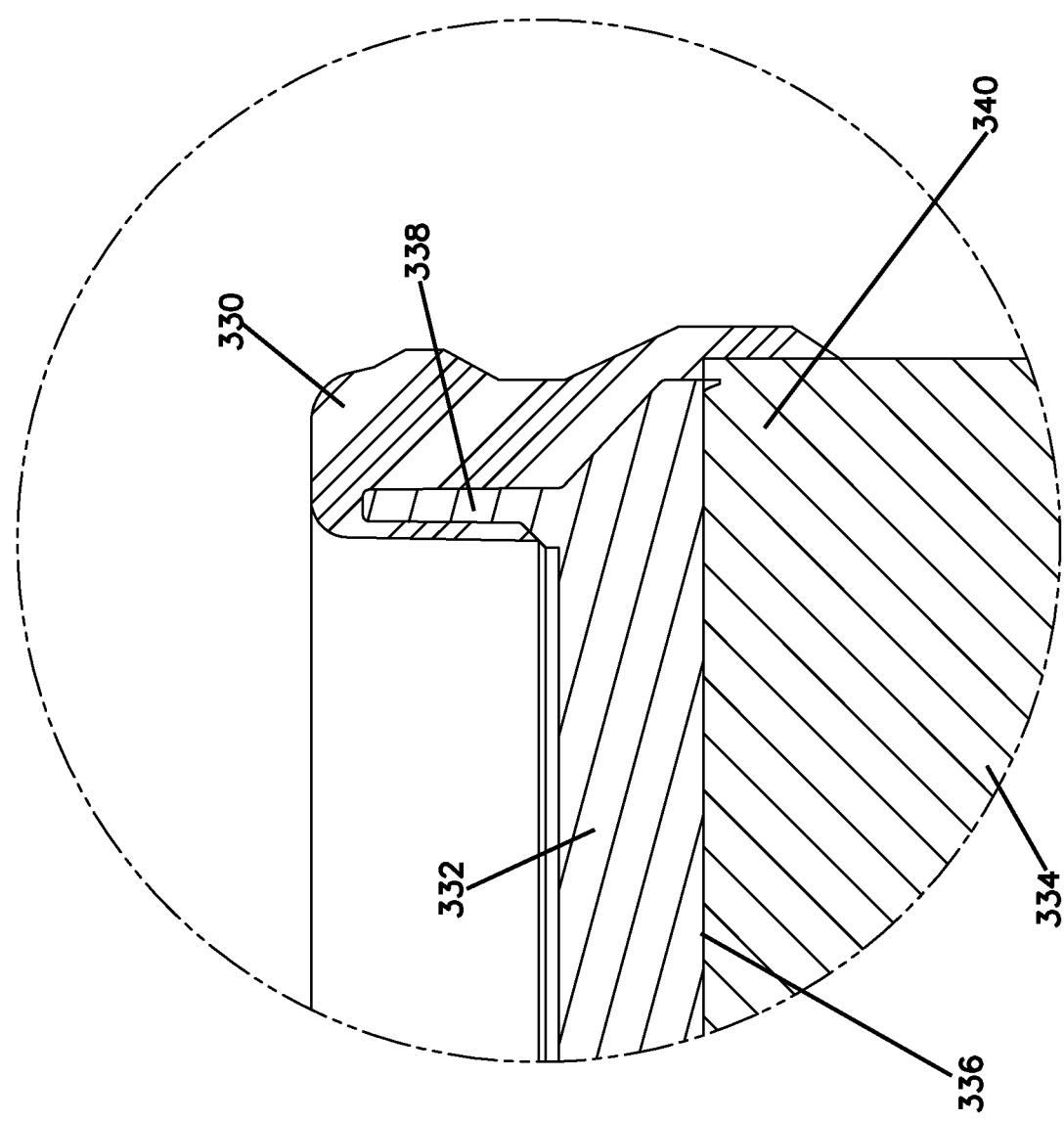
FIG. 14 is a partial, sectional view of a filter element containing a filter media pack according to the principles of this disclosure.
Figure 15:
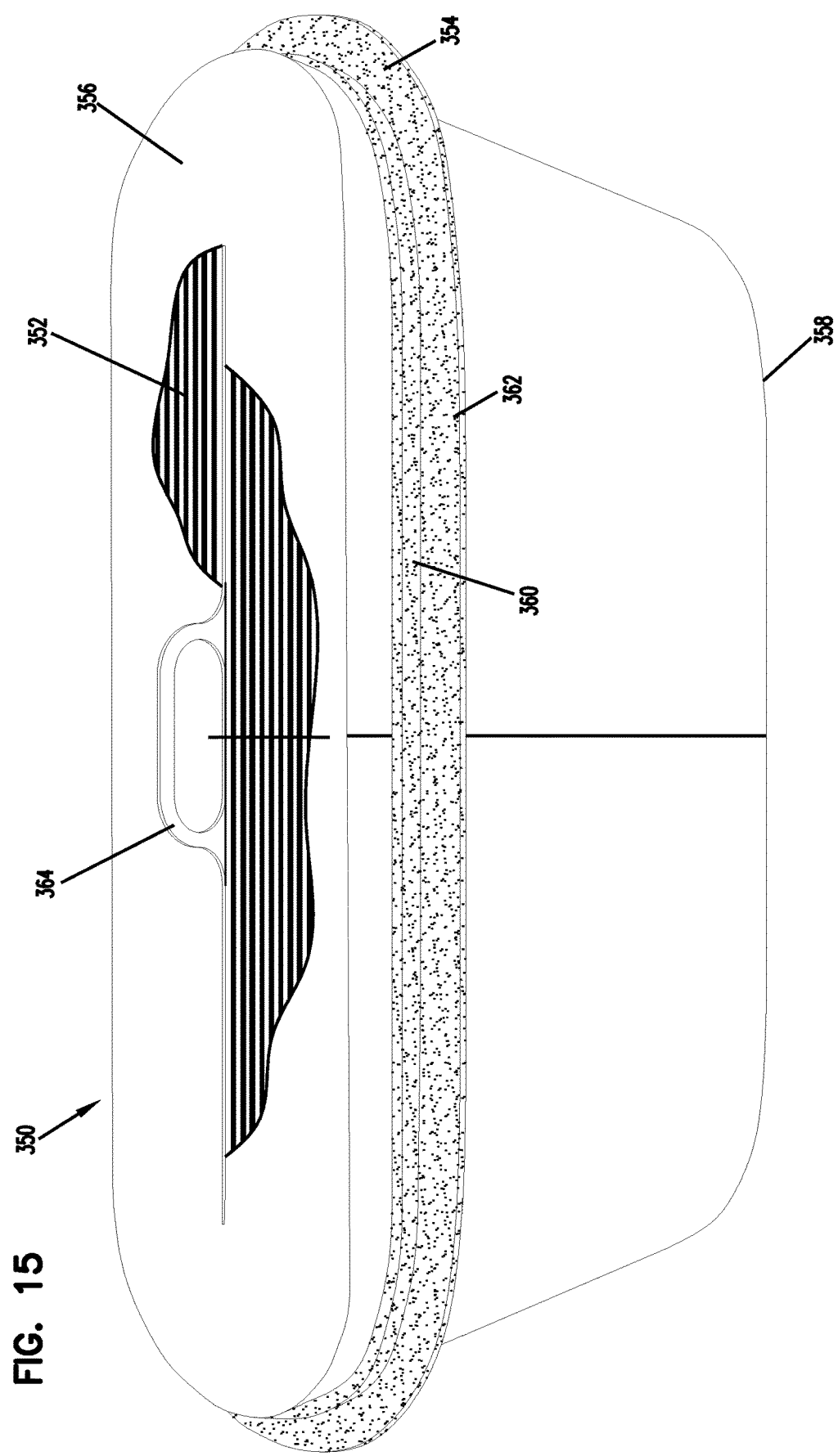
FIG. 15 is a perspective view of a filter element containing a filter media pack according to the principles of this disclosure.

The filtration media pack can be provided as part of a filter element having a variation on the radial seal configuration. As shown in FIG. 14, the seal 330 can be relied upon for holding the frame 332 to the media pack 334. As shown in FIG. 14, the frame 332 can be attached to the media pack 334 by molding the seal 330 to the seal support 338 and the media pack 334. As shown in FIG. 14, the frame 338 can be provided adjacent to the first face 336 and the seal 330 can be provided so that it holds the support 332 onto the media pack 334 without the use of additional adhesive. The seal 330 can be characterized as an overmold seal and that it extends along both sides of the seal support 338 and onto the outer surface of the media pack 334 at the first end 340.

The filtration media pack can be provided as part of a filter element according to U.S. Pat. No. 6,235,195, the entire disclosure of which is incorporated herein by reference. Now referring to FIG. 15, the filter element 350 includes a wound media pack 352 having an obround or racetrack shape, and an axial pinch seal 354 attached near an end of the media pack and circumscribing the exterior of the media pack. The axial pinch seal 354 is shown provided between the first face 356 and the second face 358 of the media pack. The axial pinch seal 354 includes a base portion 360 and a flange portion 362. The base portion 362 can be provided for attaching to the media pack. The flange portion 362 can be pinched between two surfaces to create a seal. One of the surfaces can be a surface of the housing that contains the filter element 350. In addition, the other structure that pinches the flange 362 can be an access cover or another structure provided within the housing that helps maintain the seal so that unfiltered air passes through the media pack without bypassing the media pack. The filter element 350 can include a handle 364 extending axially from the first face 356. If desired, the handle can be provided extending axially from the second face 358. The handle 364 allows one to pull or remove the filter element 350 from the housing. The handle 364 can be provided as part of a center board extending into the media pack and sealed thereto.

Figure 16:
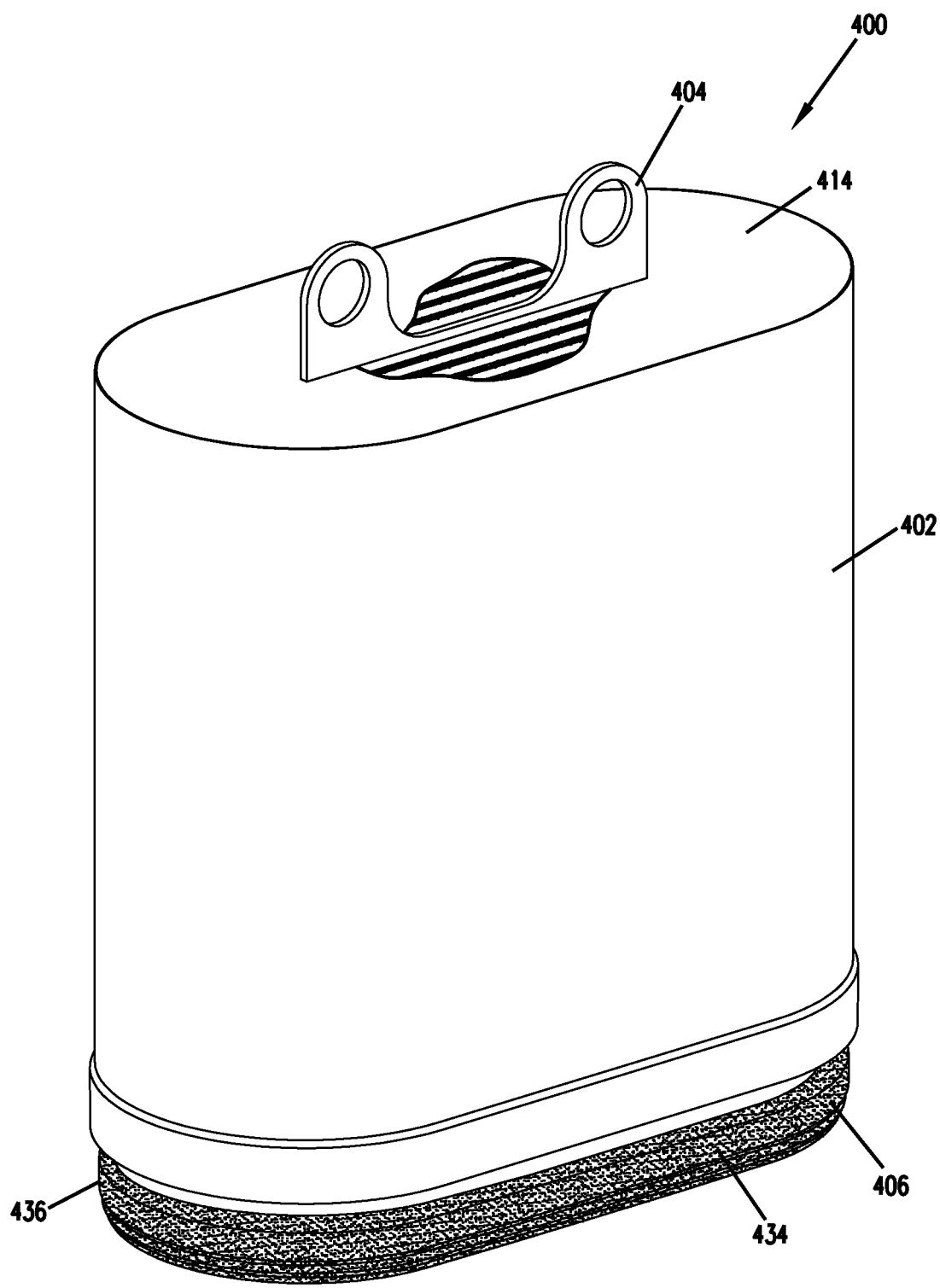
FIG. 16 is a perspective view of a filter element containing a filter media pack according to the principles of this disclosure.
Figure 17:
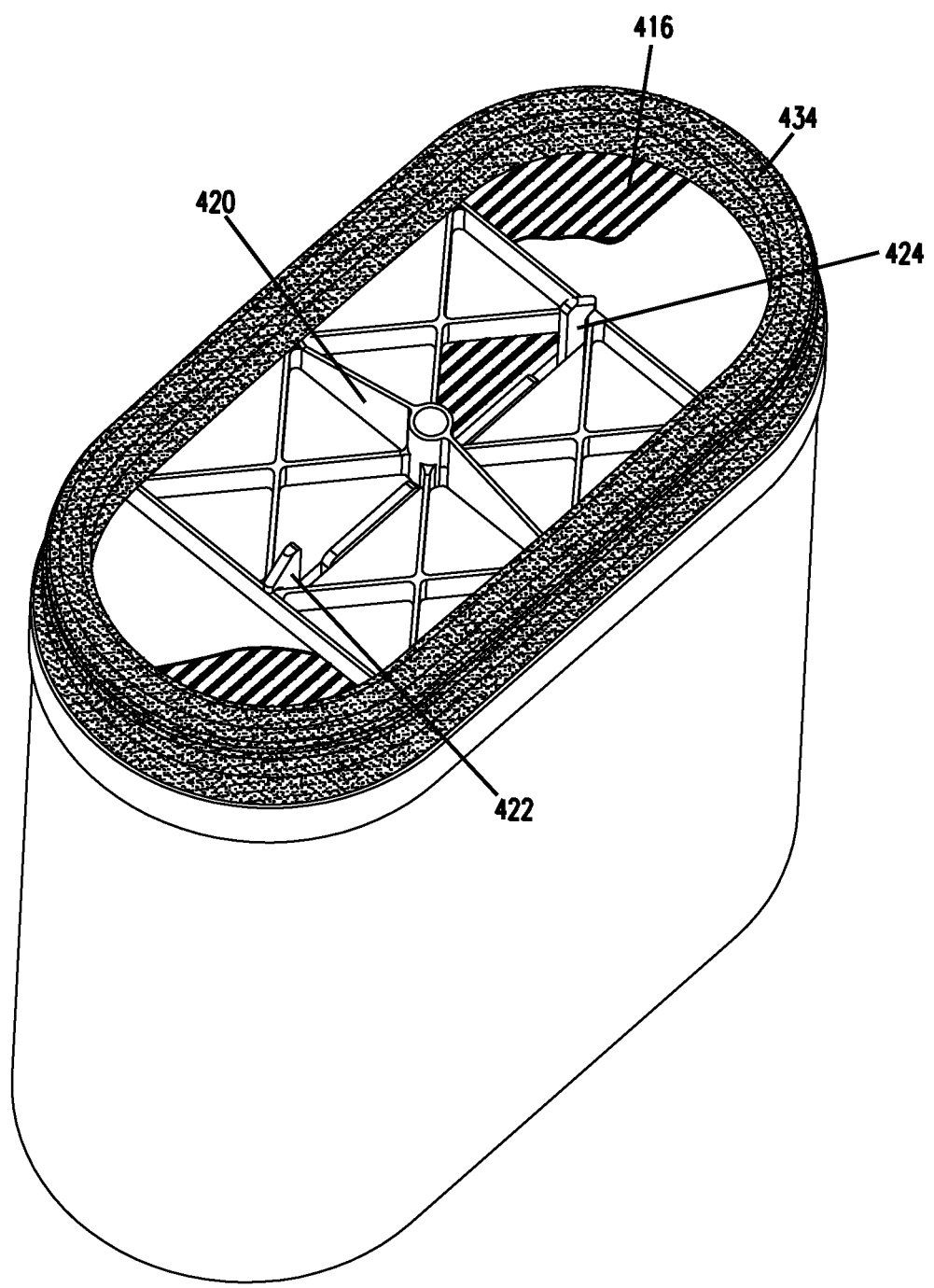
FIG. 17 is a bottom, perspective view of the filter element of FIG. 16.
Figure 18:
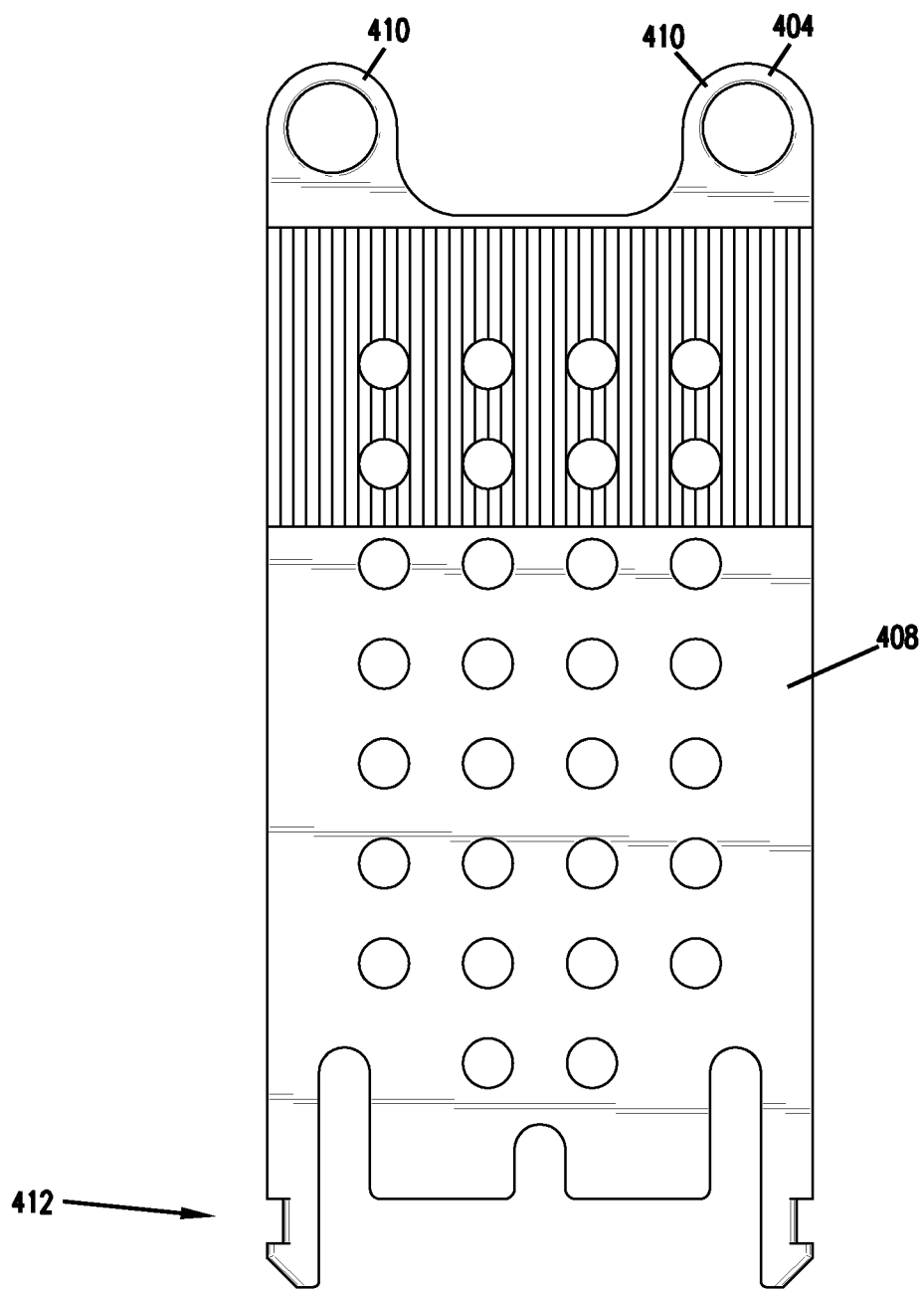
FIG. 18 is a side view of the center board of the filter element of FIGS. 16 and 17.
Figure 19:
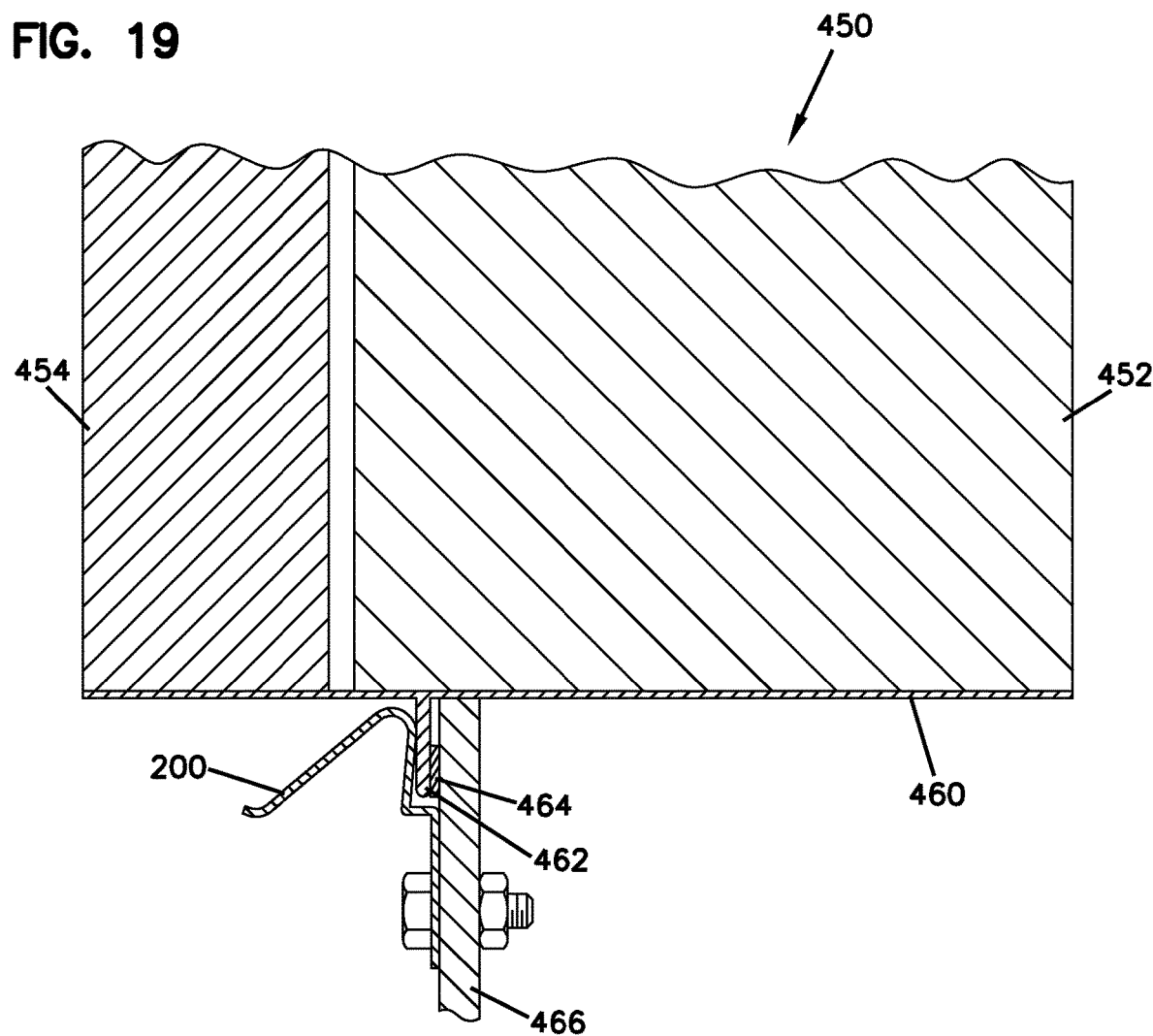
FIG. 19 is a partial, sectional view of a filter arrangement containing a filter media pack according to the principles of this disclosure.
Figure 20:
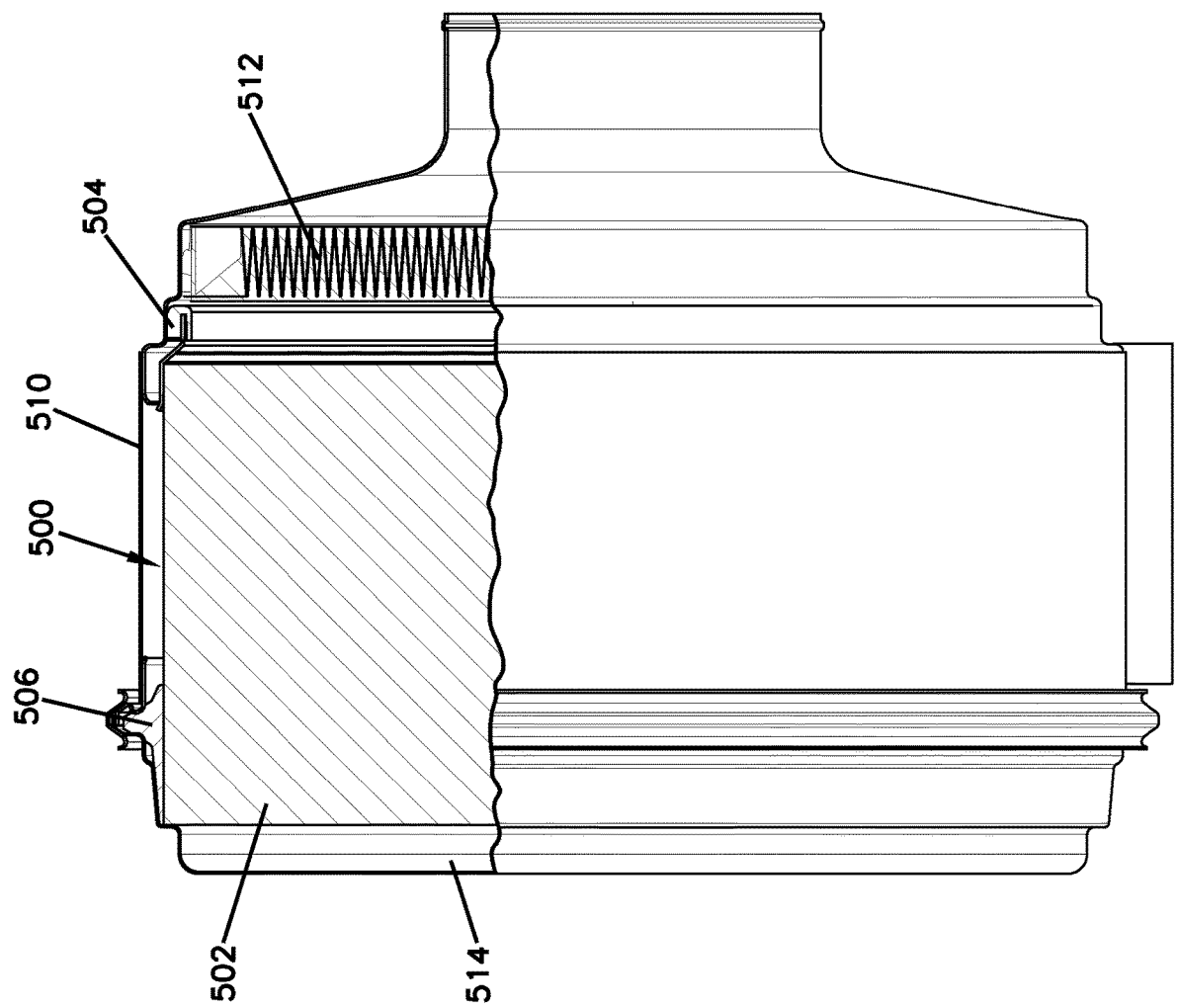
FIG. 20 is a partial, sectional view of an air cleaner having a filter element containing a filter media pack according to the principles of this disclosure.
Figure 21:
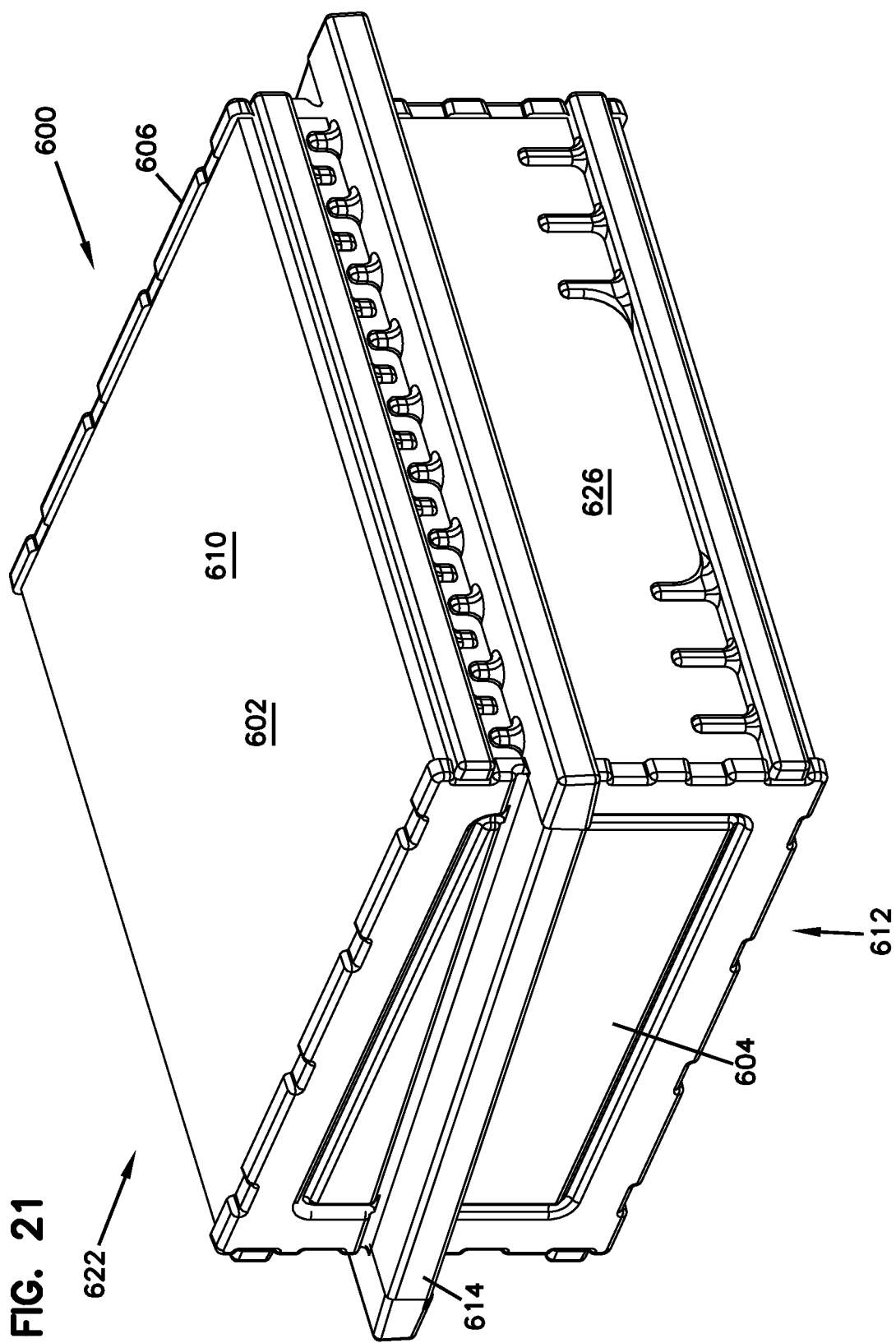
FIG. 21 is a perspective view of an exemplary element containing a filter media pack according to the principles of this disclosure.
Figure 22:
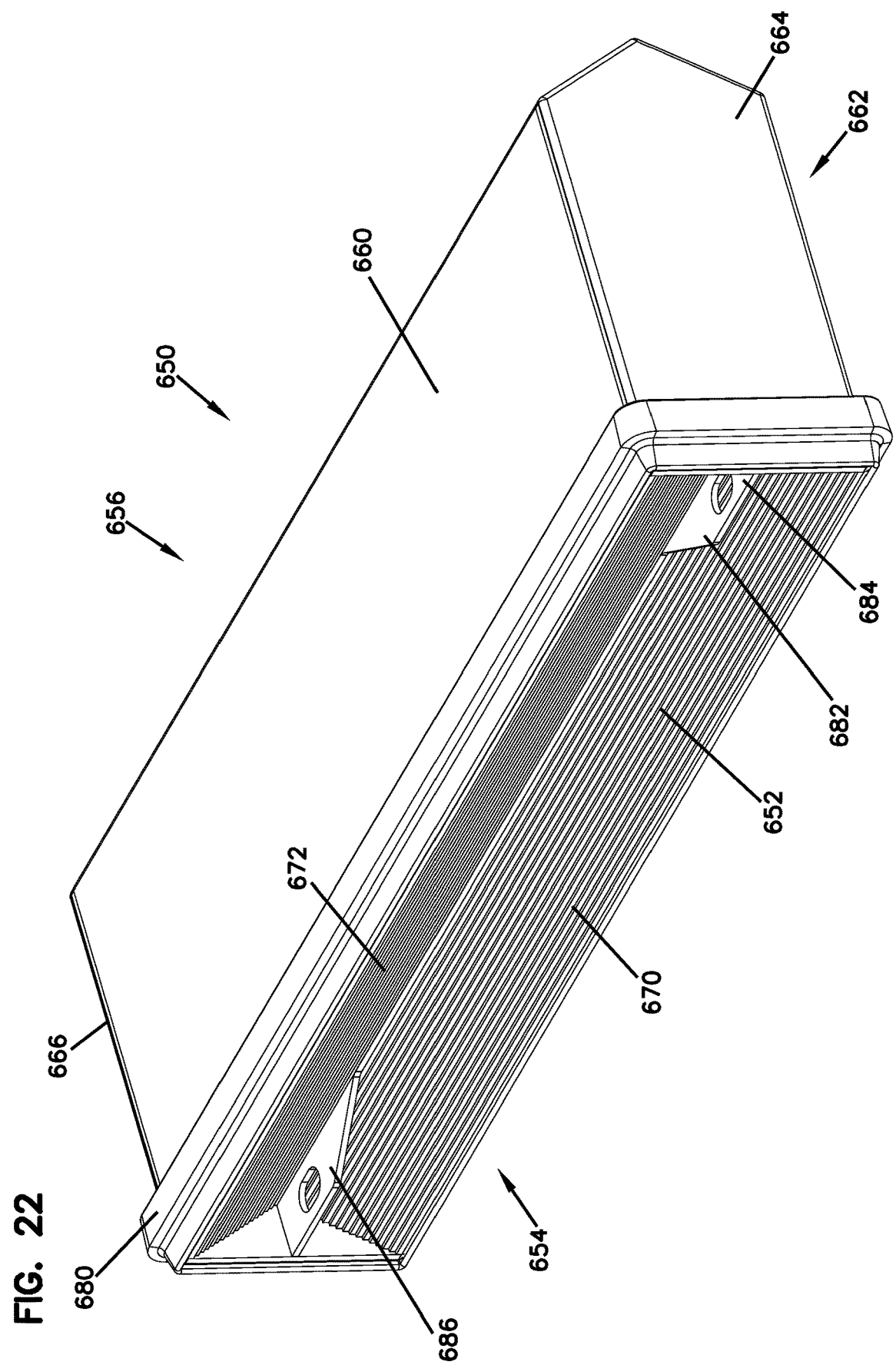
FIG. 22 is a perspective view of an exemplary filter element containing a filter media pack according to the principles of this disclosure.
Figure 23:
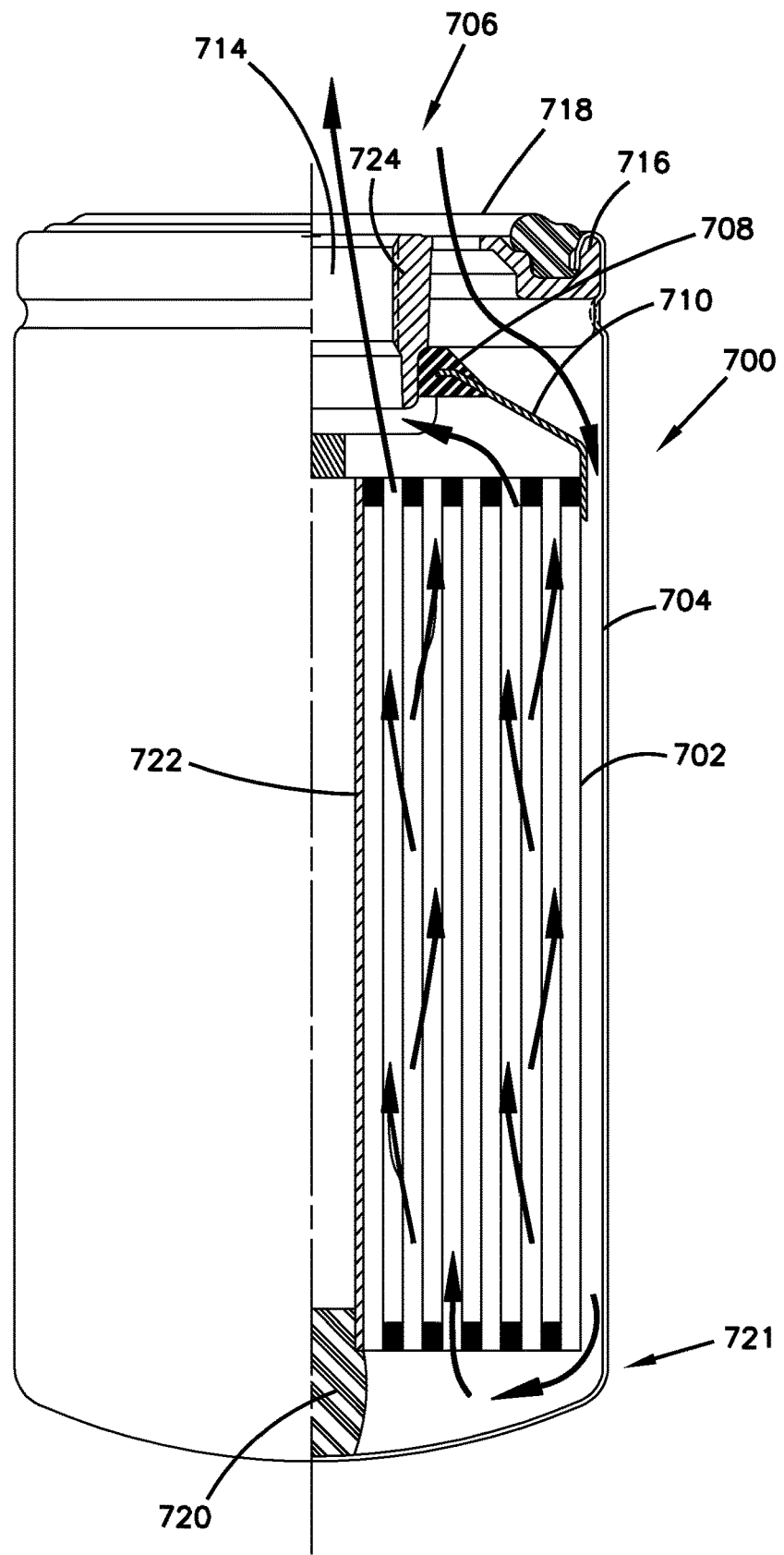
FIG. 23 is a partial sectional view of an exemplary liquid filter according to the principles of this disclosure.

Now referring to FIGS. 16-18, a filter element is shown at reference number 400. The filter element 400 includes a wound media pack 402, a handle arrangement 404, and a seal arrangement 406. Details of this filter element construction can be found in U.S. Pat. No. 6,348,084, the entire disclosure of which is incorporated herein by reference. The previously described single facer media can be used to prepare the media pack 402 of the filter element 400.

The handle arrangement 404 includes a center board 408, handles 410, and a hook construction 412. The single facer media can be wound around the center board 408 so that the handles 410 extend axially from a first face 414 of the media pack 402. The hook arrangement 412 can extend from the second face 416 of the media pack 402. The handles 410 allow an operator to remove the filter element 400 from a housing. The hook construction 412 provides for attachment to a cross brace or support structure 420. The hook construction 412 includes hook members 422 and 424 that engage the cross brace or support structure 420. The cross brace or support structure 420 can be provided as part of a seal support structure 320 (FIG. 13) that extends from the second face 416 and includes a seal support member 314. A seal member 434 (similar to seal member 316 in FIG. 13) can be provided on the seal support member to provide a seal between the filter element 400 and a housing. The seal 434 can be characterized as a radial seal when the seal is intended to provide sealing as a result of contact of a radially facing seal surface 436 and a housing seal surface.

The filtration media pack can be provided as part of a gas turbine system as shown in U.S. Pat. No. 6,348,085, the entire disclosure of which is incorporated herein by reference. An exemplary gas turbine filtration element is shown at reference number 450 in FIG. 19. The filter element 450 can include a primary filter element 452 and a secondary filter element 454. The secondary filter element 454 can be referred to as a safety filter element. The primary of main filter element 452 can be provided as an filtration media pack as previously described in this application. The filtration media pack can be provided as a result of winding a single facer media or as a result of stacking a single facer media. The primary filter element 452 and the secondary filter element 454 can be secured within a sleeve member 460. The sleeve member 460 can include a flange 462 that includes a seal 464. When installed, the element 450 can be provided so that the flange 462 and seal 464 are provided adjacent a support 466 and held in place by a clamp 200 so that the seal 464 provides a sufficient seal so that unfiltered air does not bypass the filter element 450.

The filtration media pack can be provided as part of a filter element as described in U.S. Pat. No. 6,610,126, the entire disclosure of which is incorporated herein by reference. Now referring to FIG. 20, the filter element 500 includes a filtration media pack 502, a radial seal arrangement 504, and a dust seal or secondary seal arrangement 506. The filter element 500 can be provided within an air cleaner housing 510 and can include, downstream of the filter element 500, a safety or secondary filter element 512. Furthermore, an access cover 514 can be provided for enclosing the housing 510. The housing 510 and the access cover 514 can pinch the dust seal 506 so that the dust seal 506 can be characterized as a pinch seal.

The filtration media pack can be provided as a stacked media pack arrangement according to International Publication No. WO 2006/076479 and International Publication No. WO 2006/076456, the disclosures of which are incorporated herein by reference. Now referring to FIG. 21, a filter element is shown at reference number 600 that includes a blocked stacked, media pack 602. The blocked stacked media pack 602 can be characterized as a rectangular or right (normal) parallelogram media pack. To seal the opposite ends of the media pack 602 are positioned side panels 604 and 606. The side panels 604 and 606 seal the lead end and tail end of each stacked, media. The media pack 602 has opposite flow faces 610 and 612. Fluid such as air flows into one of the flow faces 610 and 612 and out the other of the flow faces 610 and 612. It is pointed out that no flow path between faces 610 and 612 is provided that does not also require the air to pass through media of the media pack 602 and thus to be filtered. A peripheral, perimeter, housing seal ring 614 is positioned in the air filter element 600. The particular seal ring 614 depicted is an axial pinch seal ring. If desired, a protective sheath or panel can be provided over the media pack surfaces 626 and 622.

The filtration media pack can be provided as a stacked media pack arrangement in a configuration according to International Publication No. WO 2007/133635, the entire disclosure of which is incorporated herein by reference. Now referring to FIG. 22, a filter element is shown at reference number 650. The filter element 650 includes a stacked media arrangement 652 having a first, in this instance, inlet face 654, and an opposite second, in this instance, outlet face 656. In addition, the filter element 650 includes an upper side 660, a lower side 662, and opposite side ends 664 and 666. The stacked media arrangement 652 generally comprises one or more stacks of strips. The strips can be provided in a slanted arrangement. The strips are organized with dimples extending between the inlet face 654 and the outlet face 656. The filter element 650 depicted comprises a stacked media pack arrangement comprising two stacked media pack sections 670 and 672. A seal member 680 can be molded to the media pack. In addition, the filter element 650 includes an axially extending handle 682. The axially extending handle 682 can be provided having a first handle 684 and a second handle 686. The handle 682 can be attached to a center board extending within the media pack wherein the single facer media can be sealed to the center board.

The filtration media pack can be provided as part of a liquid filtration system according to, for example, U.S. Pat. No. 5,895,547, the entire disclosure of which is incorporated herein by reference. No referring to FIGS. 23 and 24, alternative liquid filtration system as shown at reference numbers 700 and 700A. The filter apparatus 700 is configured for use as a liquid filter and is a spin-on filter mounting onto a fitting for a circulating fluid system such as a diesel fuel filter for engine oil filter. The filter includes a filter element 702 inside a filter housing 704. The fluid enters an open end 706, flows axially through the filter 702 and then exits the open end 706. The filter element 702 has an end cap 710 mounted thereon and a gasket 708 forming a seal between the end cap and the annular centered divider segment 724 of a mounting element 716. A gasket 718 forms a seal between the mounting element 716 and a mounting fixture. The end cap 710 may include a cross braces, with provide additional support at the end of the filter element 702. A center plug 720 is at the closed end of the housing 721 to block the center portion of the filter element 702 and may also provide biasing force between the filter element 702 and the housing 704 to aid in positioning the filter elements 702. In the embodiment shown, the filter element 702 includes a center tube 722 around which it is round. However, it can be appreciated that the center tube 722 could be a solid member or the tube may be eliminated so that liquid flows on the periphery of the filter element and then reverses to flow from the closed end and through the filter element 702. As shown, fluid enters the opened end 706 in the annular opening of the mounting member 716 between the gasket 718 and the center annular divider segments 724. The unfiltered fluid then flows on the exterior of the end cap 710 along the inner wall of the housing 704 to the closed end 721 of the housing 704. Fluid then flows through the open ends of the filter element 702, passing through the media and exits the housing open end 106.

Figure 24:
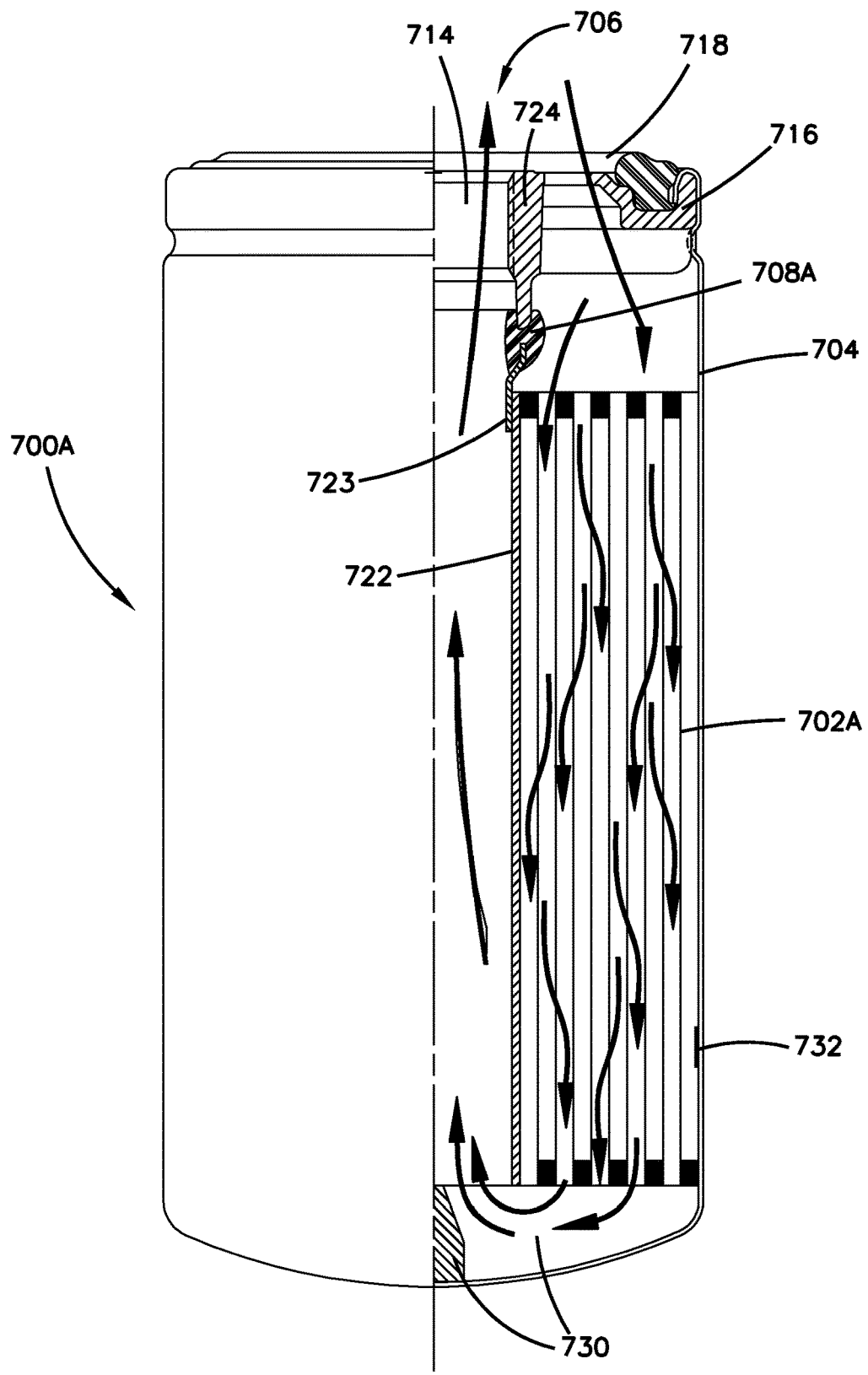
FIG. 24 is a partial sectional view of an exemplary liquid filter according the principles of this disclosure.

Alternatively, FIG. 24 shows an alternate embodiment designated 700A. The filtration system 700A includes a filter element 702A and a housing 704. The interior configuration provides a flow pattern wherein liquid flows from the open end 706 axially through the filter element 702A to the closed end 721 of the housing 704 and then upward through the center tube 722 exiting the open end 706 on the interior of the center divider segment 724 through the center outlet 714. The filtration system 700A includes the mounting member 716 and the gasket 718 forming a seal between the mounting member 716 and a fitting. The filter apparatus 700A does not require an end cap proximate the open end as flows directly enters the filter element 702A proximate the open end 706. A gasket 708A inserts intermediate the center tube 722 which has an extension 723 extending upward therefrom that engages the center divider segments 724. A seal 732 can be provided between the filter element 702A and the housing 704 to prevent fluid from by-passing the filter element 702A. The liquid flows in the direction indicated by the arrows.

It should be appreciated that, in view of exemplary FIGS. 13-24, that the filtration media pack can be provided in various configurations to form filter elements that can then be used in various housing arrangements to provide enhanced performance.

Observations

In this summary, some selective, summary characterizations of teachings herein are provided. Among what is taught are:

1. A filter media pack comprising:
   (a) a media construction comprising alternating first media sheet and second media sheet secured together and forming a first flow face and a second flow face, wherein each of the first media sheet and the second media sheet includes a first side and a second side;
      (i) the first media sheet including a plurality of first bosses extending from the first media sheet first side toward the second media sheet to provide a first separation between the first media sheet first side and the second media sheet second side;
      (ii) the second media sheet including a plurality of second bosses extending from the second media sheet first side in a same direction as the plurality of first bosses to provide a second separation between the second media sheet first side and the first media sheet second side;
      (iii) the first media sheet and the second media sheet secured together at a first location to form the first separation open at the second flow face, and the first media sheet and the second media sheet secured together at a second location to form the second separation open at the first flow face;
   (b) the media construction being closed to passage of unfiltered fluid therethrough from the first flow face to the second flow face or from the second flow face to the first flow face without filtering passage through the first media sheet or the second media sheet.

2. A filter media pack according to characterization 1 wherein:
   (a) the first media sheet and the second media sheet each comprise a first edge that forms the first flow face and a second edge that forms the second, opposite, flow face, the first location for adhering the first media sheet to the second media sheet is located proximate the first edge, and the second location for adhering the first media sheet and the second media sheet is located the second edge.

3. A filter media pack according to any one of characterizations 1 and 2 wherein:
   (a) the first media sheet includes a plurality of third bosses extending from the first media sheet second side in a direction opposite the plurality of first bosses to provide the second separation between the first media sheet second side and the second media sheet first side.

4. A filter media pack according to any one of characterization 1-3 wherein:
   (a) the second media sheet includes a plurality of fourth bosses extending from the second media sheet second side in a direction opposite the plurality of first bosses to provide the first separation between the second media sheet second side and the first media sheet first side.

5. A filter media pack according to any one of characterizations 1-4 wherein:
   (a) the plurality of first bosses extend away from the first media sheet a distance of at least 0.01 inch.

6. A filter media pack according to any one of characterizations 1-4 wherein:
   (a) the plurality of first bosses extend away from the media sheet a distance of about 0.01 inch to about 0.25 inch, or about 0.05 inch to about 0.2 inch.

7. A filter media pack according to any one of characterizations 1-6 wherein:
   (a) the plurality of second bosses extend away from the second media sheet a distance of at least 0.01 inch.

8. A filter media pack according to any one of characterizations 1-6 wherein:
   (a) the plurality of second bosses extend away from the second media sheet a distance of about least 0.01 inch to about 0.25 inch, or about 0.05 inch to about 0.2 inch.

9. A filter media pack according to any one of characterizations 1-8 wherein:
   (a) the plurality of first bosses are separated from each other by a distance of at least 0.03 inch.

10. A filter media pack according to any one of characterizations 1-8 wherein:
    (a) the plurality of first bosses are separated from each other by a distance of about 0.03 inch to about 4.0 inches.

11. A filter media pack according to any one of characterizations 1-10 wherein:
    (a) the plurality of second bosses are separated from each other by a distance of at least 0.03 inch.

12. A filter media pack according to any one of characterizations 1-10 wherein:
    (a) the plurality of second bosses are separated from each other by a distance of about 0.03 inch to about 4.0 inches.

13. A filter media pack according to any one of characterizations 1-12 wherein:
    (a) the plurality of first bosses are provided with a boss density of at least about 0.25 per square inch.

14. A filter media pack according to any one of characterizations 1-13 wherein:
    (a) the plurality of second bosses are provided with a boss density of at least about 0.25 per square inch.

15. A filter media pack according to any one of characterizations 1-14 wherein:
    (a) the media construction exhibits a volume asymmetry where one side exhibits a separation that is 110% or greater compared to another side, preferably the separation is 110% to 200%, or 130% to 170%.

16. A filter media pack according to any one of characterizations 1-15 wherein:
    (a) the first location comprises a first glue bead adhering the first media sheet and second media sheet; and
    (b) the second location comprises a second glue bead adhering the first media sheet and second media sheet.

17. A filter media pack according to any one of characterizations 1-16 wherein:
   (a) the plurality of first bosses have a conical sidewall.
18. A filter media pack according to any one of characterizations 1-17 wherein:
   (a) the plurality of second bosses have a conical sidewall.
19. A filter media pack according to any one of characterizations 1-18 wherein:
   (a) the plurality of first bosses have a domed top.
20. A filter media pack according to any one of characterizations 1-19 wherein:
   (a) the plurality of second bosses have a domed top.
21. A filter media pack according any one of characterizations 1-20 wherein:
   (a) the filter media construction is in a coiled configuration.
22. A filter media pack according any one of characterizations 1-20 wherein:
   (a) the filter media construction is in a stacked configuration.
23. A filter media pack according to any one of characterizations 1-22 wherein:
   (a) neither of the first media sheet nor the second media sheet is a fluted or corrugated media sheet.
24. A filter media pack comprising:
   (a) a media construction comprising alternating first media sheet and a second media sheet secured together and forming a first flow face and a second flow face, wherein each of the first media sheet and the second media sheet includes a first side and a second side;
      (i) the first media sheet including a plurality of first bosses extending from the first media sheet first side toward the second media sheet to provide a first separation between the first media sheet first side and the second media sheet second side, and a plurality of second bosses extending from the first media sheet second side in a direction opposite the plurality of first bosses to provide a second separation between the first media sheet second side and the second media sheet first side;
      (ii) the first media sheet and the second media sheet secured together at a first location to form the first separation open at the second flow face, and the first media sheet and the second media sheet secured together at a second location to form the second separation open at the first flow face;
   (b) the media construction being closed to passage of unfiltered fluid therethrough from the first flow face to the second flow face or from the second flow face to the first flow face without filtering passage through the first media sheet or the second media sheet.
25. A filter media pack according to characterization 24 wherein:
   (a) the first media sheet and the second media sheet each comprise a first edge that forms the first flow face and a second edge that forms the second, opposite, flow face, the first location for adhering the first media sheet to the second media sheet is located proximate the first edge, and the second location for adhering the first media sheet and the second media sheet is located proximate the second edge.
26. A filter media pack according to any one of characterizations 24 and 25 wherein:
   (a) the second media sheet includes a plurality of third bosses extending from the second media sheet first side in a same direction as the plurality of first bosses to provide the second separation between the second media sheet first side and the first media sheet second side.
27. A filter media pack according to any one of characterization 24-26 wherein:
   (a) the second media sheet includes a plurality of fourth bosses extending from the second media sheet second side in an opposite direction as the plurality of first bosses to provide the first separation between the second media sheet second side and the first media sheet first side.
28. A filter media pack according to any one of characterizations 24-27 wherein:
   (a) the plurality of first bosses extend away from the first media sheet a distance of at least 0.01 inch.
29. A filter media pack according to any one of characterizations 24-27 wherein:
   (a) the plurality of first bosses extend away from the media sheet a distance of about 0.01 inch to about 0.25 inch, or about 0.05 inch to about 0.2 inch.
30. A filter media pack according to any one of characterizations 24-29 wherein:
   (a) the plurality of second bosses extend away from the second media sheet a distance of at least 0.01 inch.
31. A filter media pack according to any one of characterizations 24-29 wherein:
   (a) the plurality of second bosses extend away from the second media sheet a distance of about least 0.01 inch to about 0.25 inch, or about 0.05 inch to about 0.2 inch.
32. A filter media pack according to any one of characterizations 24-31 wherein:
   (a) the plurality of first bosses are separated from each other by a distance of at least 0.03 inch.
33. A filter media pack according to any one of characterizations 24-31 wherein:
   (a) the plurality of first bosses are separated from each other by a distance of about 0.03 inch to about 4.0 inches.
34. A filter media pack according to any one of characterizations 24-33 wherein:
   (a) the plurality of second bosses are separated from each other by a distance of at least 0.03 inch.
35. A filter media pack according to any one of characterizations 24-33 wherein:
   (a) the plurality of second bosses are separated from each other by a distance of about 0.03 inch to about 4.0 inches.
36. A filter media pack according to any one of characterizations 24-35 wherein:
   (a) the plurality of first bosses are provided with a boss density of at least about 0.25 per square inch.
37. A filter media pack according to any one of characterizations 24-36 wherein:
   (a) the plurality of second bosses are provided with a boss density of at least about 0.25 per square inch.
38. A filter media pack according to any one of characterizations 24-37 wherein:
   (a) the media construction exhibits a volume asymmetry where one side exhibits a separation that is 110% or greater compared to another side, preferably the separation is 110% to 200%, or 130% to 170%.
39. A filter media pack according to any one of characterizations 24-37 wherein:
   (a) the first location comprises a first glue bead adhering the first media sheet and second media sheet; and
   (b) the second location comprises a second glue bead adhering the first media sheet and second media sheet.

40. A filter media pack of any one of characterizations 24-29 wherein:
   (a) the plurality of first bosses have a conical sidewall.
41. A filter media pack according to any one of characterizations 24-40 wherein:
   (a) the plurality of second bosses have a conical sidewall.
42. A filter media pack according to any one of characterizations 24-41 wherein:
   (a) the plurality of first bosses have a domed top.
43. The filter media pack according to any one of characterizations 24-42 wherein:
   (a) the plurality of second bosses have a domed top.
44. A filter media pack according any one of characterizations 24-43 wherein:
   (a) the filter media pack is in a coiled configuration.
45. A filter media pack according any one of characterizations 24-43 wherein:
   (a) the filter media pack is in a stacked configuration.
46. A filter media pack according to any one of characterizations 24-45, wherein:
   (a) neither of the first media sheet or the second media sheet is a fluted or corrugated media sheet.
47. A filter element comprising:
   (a) a filter media pack according to any one of characterizations 1-46;
   (b) a seal member to prevent fluid from bypassing the filter media pack when the filter element is installed for use.
48. A filter element according to characterizations 47, wherein the seal member comprises a radially directed seal member.
49. A filter element according to characterizations 47, wherein the seal member comprises an axially directed seal member.
50. A filter element according to any one of characterizations 47-49, wherein the seal member is molded to the filter media pack.
51. A filter element according to any one of characterizations 47-50, wherein the seal member extends around a periphery of the filter media pack.
52. A filter element according to any one of characterizations 47-51, wherein the seal member is located spaced away from the first flow face or the second flow face of the media pack, and is not located around a periphery of the media pack.
53. A method of making the filter media pack of any one of characterizations 1-46 comprising:
   (a) adhering together at a first location the first media sheet and second media sheet to form the first separation open at the second flow face; and
   (b) rolling or stacking the first media sheet and the second media sheet together while adhering together at a second location the first media sheet and second media sheet to form the second separation open at the first flow face.
54. A method according to characterization 53 wherein:
   (a) the step of adhering includes applying adhesive.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

The above specification provides a complete description of the manufacture and use of the composition of the invention. Since many embodiments of the invention can be made without departing from the spirit and scope of the invention, the invention resides in the claims hereinafter appended.

What is claimed is:

1. A filter media pack comprising:
   (a) a media construction comprising alternating first media sheet and second media sheet secured together and forming a first flow face and a second flow face, wherein each of the first media sheet and the second media sheet includes a first side and a second side;
      (i) the first media sheet including a plurality of first bosses extending from the first media sheet first side toward the second media sheet to provide a first separation between the first media sheet first side and the second media sheet second side;
      (ii) the second media sheet including a plurality of second bosses extending from the second media sheet first side in a same direction as the plurality of first bosses to provide a second separation between the second media sheet first side and the first media sheet second side;
      (iii) the first media sheet and the second media sheet secured together at a first location to form the first separation open at the second flow face, and the first media sheet and the second media sheet secured together at a second location to form the second separation open at the first flow face;
   (b) the media construction being closed to passage of unfiltered fluid therethrough from the first flow face to the second flow face or from the second flow face to the first flow face without filtering passage through the first media sheet or the second media sheet;
      wherein the first separation is greater than the second separation; and
      wherein the first bosses and second bosses have substantially circular bases.

2. A filter media pack according to claim 1 wherein:
   (a) the first media sheet and the second media sheet each comprise a first edge that forms the first flow face and a second edge that forms the second, opposite, flow face, the first location for adhering the first media sheet to the second media sheet is located proximate to the first edge, and the second location for adhering the first media sheet and the second media sheet is located the second edge.

3. A filter media pack according to claim 1 wherein:
   (a) the first media sheet includes a plurality of third bosses extending from the first media sheet second side in a direction opposite the plurality of first bosses to provide the second separation between the first media sheet second side and the second media sheet first side.

4. A filter media pack according to claim 1 wherein:
   (a) the second media sheet includes a plurality of fourth bosses extending from the second media sheet second side in a direction opposite the plurality of first bosses to provide the first separation between the second media sheet second side and the first media sheet first side.

5. A filter media pack according to claim 1 wherein:
(a) the plurality of first bosses extend away from the first media sheet a distance of at least 0.01 inch.
6. A filter media pack according to claim 1 wherein:
(a) the plurality of first bosses extend away from the media sheet a distance of about 0.01 inch to about 0.25 inch, or about 0.05 inch to about 0.2 inch.
7. A filter media pack according to claim 1 wherein:
(a) the plurality of second bosses extend away from the second media sheet a distance of at least 0.01 inch.
8. A filter media pack according to claim 1 wherein:
(a) the plurality of first bosses are provided with a boss density of at least about 0.25 per square inch.
9. A filter media pack according to claim 1 wherein:
(a) the plurality of second bosses are provided with a boss density of at least about 0.25 per square inch.
10. A filter media pack according to claim 1 wherein:
(a) the media construction exhibits a volume asymmetry where one side exhibits a separation that is 110% or greater compared to another side.
11. A filter media pack according to claim 1 wherein:
(a) the plurality of first bosses have a conical sidewall.
12. A filter media pack according to claim 1 wherein:
(a) the plurality of second bosses have a conical sidewall.
13. A filter media pack according to claim 1 wherein:
(a) the plurality of first bosses have a domed top.
14. A filter media pack according to claim 1 wherein:
(a) the plurality of second bosses have a domed top.
15. A filter media pack according to claim 1 wherein:
(a) neither of the first media sheet nor the second media sheet is a fluted or corrugated media sheet.
16. A filter media pack comprising:
(a) a media construction comprising alternating first media sheet and a second media sheet secured together and forming a first flow face and a second flow face, wherein each of the first media sheet and the second media sheet includes a first side and a second side;
  (i) the first media sheet including a plurality of first bosses extending from the first media sheet first side toward the second media sheet to provide a first separation between the first media sheet first side and the second media sheet second side, the first bosses have a length and a width that are substantially equal to one another, and a plurality of second bosses extending from the first media sheet second side in a direction opposite the plurality of first bosses to provide a second separation between the first media sheet second side and the second media sheet first side;
  (ii) the first media sheet and the second media sheet secured together at a first location to form the first separation open at the second flow face, and the first media sheet and the second media sheet secured together at a second location to form the second separation open at the first flow face;
(b) the media construction being closed to passage of unfiltered fluid therethrough from the first flow face to the second flow face or from the second flow face to the first flow face without filtering passage through the first media sheet or the second media sheet;
wherein the first separation is greater than the second separation.
17. A filter media pack according to claim 16 wherein:
(a) the first media sheet and the second media sheet each comprise a first edge that forms the first flow face and a second edge that forms the second, opposite, flow face, the first location for adhering the first media sheet to the second media sheet is located proximate to the first edge, and the second location for adhering the first media sheet and the second media sheet is located proximate to the second edge.
18. A filter media pack according to claim 16 wherein:
(a) the second media sheet includes a plurality of third bosses extending from the second media sheet first side in a same direction as the plurality of first bosses to provide the second separation between the second media sheet first side and the first media sheet second side.
19. A filter media pack according to claim 16 wherein:
(a) the second media sheet includes a plurality of fourth bosses extending from the second media sheet second side in an opposite direction as the plurality of first bosses to provide the first separation between the second media sheet second side and the first media sheet first side.
20. A filter media pack according to claim 16 wherein:
(a) the media construction exhibits a volume asymmetry where one side exhibits a separation that is 110% or greater compared to another side.

\* \* \* \* \*